US007643042B2

(12) United States Patent
Kudo et al.

(10) Patent No.: US 7,643,042 B2
(45) Date of Patent: Jan. 5, 2010

(54) DISPLAY DEVICE AND DRIVING CIRCUIT FOR DISPLAYING

(75) Inventors: Yasuyuki Kudo, Kamakura (JP); Akihito Akai, Yokohama (JP); Kazuo Okado, Kokubunji (JP); Toshimitsu Matsudo, Tokyo (JP); Atsuhiro Higa, Yokohama (JP)

(73) Assignee: Renesas Technology Corporation, Tokyo (JP)

( * ) Notice: Subject to any disclaimer, the term of this patent is extended or adjusted under 35 U.S.C. 154(b) by 171 days.

(21) Appl. No.: 11/109,718

(22) Filed: Apr. 20, 2005

(65) Prior Publication Data

US 2005/0190207 A1 Sep. 1, 2005

Related U.S. Application Data

(63) Continuation of application No. 10/372,437, filed on Feb. 25, 2003, now Pat. No. 7,038,702.

(30) Foreign Application Priority Data

Apr. 26, 2002 (JP) ............................ 2002-126399

(51) Int. Cl.
*G09G 5/00* (2006.01)
*G06K 9/00* (2006.01)

(52) U.S. Cl. ......................... 345/690; 345/89; 345/211; 382/163; 382/166

(58) Field of Classification Search ......... 345/208–214, 345/690–692, 88, 89, 596, 597, 600, 605; 382/163, 166
See application file for complete search history.

(56) References Cited

U.S. PATENT DOCUMENTS 6,107,981 A 8/2000 Fujita
6,816,144 B2 * 11/2004 Tsuchi ....................... 345/100
7,046,223 B2 * 5/2006 Hashimoto ................... 345/89
7,095,991 B2 8/2006 Tsuchi et al.

FOREIGN PATENT DOCUMENTS

EP 1 184 834 A2 3/2002

(Continued)

OTHER PUBLICATIONS

Hitachi Outline (News Release) May 17, 2001 (and English Translation Thereof).

(Continued)

*Primary Examiner*—Henry N Tran
(74) *Attorney, Agent, or Firm*—Antonelli, Terry, Stout & Kraus, LLP.

(57) ABSTRACT

A display driver for outputting gradation voltages corresponding to gradation data from an external device to pixels. The display driver includes a generator for generating a plurality of gradation voltages having a plurality of levels based on a reference voltage, and a selector for selecting at least one gradation voltage corresponding to the gradation data from the plurality of gradation voltages generated by the generator. The gradation data includes multi-bits for each color of red, green and blue, and the generator outputs or stops outputting each gradation voltage according to data for color reduction from the external device. The generator stops outputting at least one gradation voltage that is unnecessary for displaying as a result of the color reduction, when the color of the gradation data is reduced according to the data for color reduction.

19 Claims, 33 Drawing Sheets

FOREIGN PATENT DOCUMENTS

| | | |
|---|---|---|
| JP | 05-313612 | 11/1993 |
| JP | 08-08702 | 4/1996 |
| JP | 09-101771 | 4/1997 |
| JP | 09-127918 | 5/1997 |
| JP | 10-326084 | 12/1998 |
| JP | 2000-338938 | 12/2000 |
| JP | 2001-108961 | 4/2001 |
| JP | 2001-345928 | 12/2001 |

OTHER PUBLICATIONS

Japanese Office Action (and English translation) dated Feb. 26, 2008, issued in counterpart Japanese Patent Application No. 2002-126399.

* cited by examiner

| Signal name | Description | "0" | "1" |
|---|---|---|---|
| RS | Address/data selection | Address | Data |
| WR | Start data write | Inactive | Active |
| D | Data | — | — |

FIG.4

| Signal name | Address specification cycle | | Data write cycle | |
|---|---|---|---|---|
| D17 | Unused | | R gradation data | R5 |
| D16 | Unused | | | R4 |
| D15 | Horizontal address | AH7 | | R3 |
| D14 | | AH6 | | R2 |
| D13 | | AH5 | | R1 |
| D12 | | AH4 | | R0 |
| D11 | | AH3 | G gradation data | G5 |
| D10 | | AH2 | | G4 |
| D9 | | AH1 | | G3 |
| D8 | | AH0 | | G2 |
| D7 | Vertical address | AV7 | | G1 |
| D6 | | AV6 | | G0 |
| D5 | | AV5 | B gradation data | B5 |
| D4 | | AV4 | | B4 |
| D3 | | AV3 | | B3 |
| D2 | | AV2 | | B2 |
| D1 | | AV1 | | B1 |
| D0 | | AV0 | | B0 |

| Setting | Description | Number of colors after reduction |
|---|---|---|
| 0 hex | No dithering (no color reduction) | 262,144 |
| 1 hex | Dither lowest-order bit in 6 bits | 32,768 |
| 2 hex | Dither two lowest-order bits in 6 bits | 4,096 |

Creating an intermediate color by spatially combining existing colors

| Vertical address [LSB] | Horizontal address [LSB] | Dither signal | | | |
|---|---|---|---|---|---|
| | | A | B | C | D |
| 0 | 0 | 0 | 0 | 0 | 0 |
| 0 | 1 | 1 | 1 | 0 | 0 |
| 1 | 0 | 1 | 1 | 1 | 0 |
| 1 | 1 | 1 | 0 | 0 | 0 |

FIG.12

| Gradation data | | | Dither signal selector output | | |
|---|---|---|---|---|---|
| MSB ⋮ ⋮ ⋮ | ⋮ | LSB | Color reduction rate data = "0" | Color reduction rate data = "1" | Color reduction rate data = "2" |
| Don't Care | 0 | 0 | Signal D | Signal B | Signal A |
| | 0 | 1 | Signal D | Signal D | Signal B |
| | 1 | 0 | Signal D | Signal B | Signal C |
| | 1 | 1 | Signal D | Signal D | Signal D |
| *Input* | | | *Output* | | |

FIG.13

| Color reduction rate data | Gradation data (MSB … LSB) | Bit manipulation A output MSB | | | | | LSB |
|---|---|---|---|---|---|---|---|
| "0" | | 0 | 0 | 0 | 0 | 0 | 0 |
| "1" | "00000" | 0 | 0 | 0 | 0 | 0 | 0 |
| | Not "00000" | 0 | 0 | 0 | 0 | | 0 |
| "2" | "0000" | 0 | 0 | 0 | 0 | 0 | 0 |
| | Not "0000" | 0 | 0 | 0 | | 0 | 0 |
| *Input* | | *Output* | | | | | |

:Dont' Care :Value of selected dither signal (A~D)

FIG.14

| Color reduction rate data | Subtractor output | Bit manipulation B output (gradation data with color reduction) |
|---|---|---|
| "0" | D5 D4 D3 D2 D1 D0 | D5 D4 D3 D2 D1 D0 |
| "1" | D5 D4 D3 D2 D1 D0 | D5 D4 D3 D2 D1 D5 |
| "2" | D5 D4 D3 D2 D1 D0 | D5 D4 D3 D2 D1 D5 |
| *Input* | | *Output* |

FIG.15

| Gradation data | Reduced-color gradation data | | |
|---|---|---|---|
| | Color reduction rate data = "0" | Color reduction rate data = "1" | Color reduction rate data = "2" |
| 0 | 0 | 0 | 0 |
| 1 | 1 | 0 | 0 |
| 2 | 2 | 0&2 | 0 |
| 3 | 3 | 2 | 0 |
| 4 | 4 | 2&4 | 0&4 |
| 5 | 5 | 4 | 0&4 |
| 6 | 6 | 4&6 | 0&4 |
| 7 | 7 | 6 | 4 |
| 8 | 8 | 6&8 | 4&8 |
| 9 | 9 | 8 | 4&8 |
| 10 | 10 | 8&10 | 4&8 |
| 11 | 11 | 10 | 8 |
| 12 | 12 | 10&12 | 8&12 |
| 13 | 13 | 12 | 8&12 |
| 14 | 14 | 12&14 | 8&12 |
| 15 | 15 | 14 | 12 |
| 16 | 16 | 14&16 | 13&17 |
| 17 | 17 | 16 | 13&17 |
| 18 | 18 | 16&18 | 13&17 |
| 19 | 19 | 18 | 17 |
| 20 | 20 | 18&20 | 17&21 |
| 21 | 21 | 20 | 17&21 |
| 22 | 22 | 20&22 | 17&21 |
| 23 | 23 | 22 | 21 |
| 24 | 24 | 22&24 | 21&25 |
| 25 | 25 | 24 | 21&25 |
| 26 | 26 | 24&26 | 21&25 |
| 27 | 27 | 26 | 25 |
| 28 | 28 | 26&28 | 25&29 |
| 29 | 29 | 28 | 25&29 |
| 30 | 30 | 28&30 | 25&29 |
| 31 | 31 | 30 | 29 |

| Gradation data | Reduced-color gradation data | | |
|---|---|---|---|
| | Color reduction rate data = "0" | Color reduction rate data = "1" | Color reduction rate data = "2" |
| 32 | 32 | 31&33 | 30&34 |
| 33 | 33 | 33 | 30&34 |
| 34 | 34 | 33&35 | 30&34 |
| 35 | 35 | 35 | |
| 36 | 36 | 35&37 | 34&38 |
| 37 | 37 | 37 | 34&38 |
| 38 | 38 | 37&39 | 34&38 |
| 39 | 39 | 39 | 38 |
| 40 | 40 | 39&41 | 38&42 |
| 41 | 41 | 41 | 38&42 |
| 42 | 42 | 41&43 | 38&42 |
| 43 | 43 | 43 | 42 |
| 44 | 44 | 43&45 | 42&46 |
| 45 | 45 | 45 | 42&46 |
| 46 | 46 | 45&47 | 42&46 |
| 47 | 47 | 47 | 46 |
| 48 | 48 | 47&49 | 47&51 |
| 49 | 49 | 49 | 47&51 |
| 50 | 50 | 48&51 | 47&51 |
| 51 | 51 | 51 | 51 |
| 52 | 52 | 51&53 | 51&55 |
| 53 | 53 | 53 | 51&55 |
| 54 | 54 | 53&55 | 51&55 |
| 55 | 55 | 55 | 55 |
| 56 | 56 | 55&57 | 55&59 |
| 57 | 57 | 57 | 55&59 |
| 58 | 58 | 57&59 | 55&59 |
| 59 | 59 | 59 | 59 |
| 60 | 60 | 59&61 | 59&63 |
| 61 | 61 | 61 | 59&63 |
| 62 | 62 | 61&63 | 59&63 |
| 63 | 63 | 63 | 63 |

FIG.16

| # | Gradation data (original image) | Reduced-color gradation data | |
|---|---|---|---|
| | | Color reduction rate data = "1" | Color reduction rate data = "2" |
| 1 | 14 14 14 14<br>14 14 14 14<br>14 14 14 14<br>14 14 14 14 | 14 12 14 12<br>12 14 12 14<br>14 12 14 12<br>12 14 12 14 | 12 12 12 12<br>8 12 8 12<br>12 12 12 12<br>8 12 8 12 |
| 2 | 39 39 39 39<br>39 39 39 39<br>39 39 39 39<br>39 39 39 39 | 39 39 39 39<br>39 39 39 39<br>39 39 39 39<br>39 39 39 39 | 38 38 38 38<br>38 38 38 38<br>38 38 38 38<br>38 38 38 38 |
| 3 | 60 60 61 61<br>60 60 61 61<br>62 62 63 63<br>62 62 63 63 | 61 59 61 61<br>59 61 61 61<br>63 61 63 63<br>61 63 63 63 | 63 59 63 59<br>59 59 59 63<br>63 63 63 63<br>59 63 63 63 |
| 4 | 0 1 2 3<br>4 5 6 7<br>8 9 10 11<br>12 13 14 15 | 0 0 2 2<br>2 4 4 6<br>8 8 10 10<br>10 12 12 14 | 0 0 0 0<br>0 4 0 4<br>8 4 8 8<br>8 12 8 12 |

FIG.18

| Gradation voltage | Power supply status | | | Gradation voltage | Power supply status | | |
|---|---|---|---|---|---|---|---|
| | Color reduction rate data = "0" | Color reduction rate data = "1" | Color reduction rate data = "2" | | Color reduction rate data = "0" | Color reduction rate data = "1" | Color reduction rate data = "2" |
| V0 | ON | ON | ON | V32 | ON | OFF | OFF |
| V1 | ON | OFF | OFF | V33 | ON | ON | OFF |
| V2 | ON | ON | OFF | V34 | ON | OFF | ON |
| V3 | ON | OFF | OFF | V35 | ON | ON | OFF |
| V4 | ON | ON | ON | V36 | ON | OFF | OFF |
| V5 | ON | OFF | OFF | V37 | ON | ON | OFF |
| V6 | ON | ON | OFF | V38 | ON | OFF | ON |
| V7 | ON | OFF | OFF | V39 | ON | ON | OFF |
| V8 | ON | ON | ON | V40 | ON | OFF | OFF |
| V9 | ON | OFF | OFF | V41 | ON | ON | OFF |
| V10 | ON | ON | OFF | V42 | ON | OFF | ON |
| V11 | ON | OFF | OFF | V43 | ON | ON | OFF |
| V12 | ON | ON | ON | V44 | ON | OFF | OFF |
| V13 | ON | OFF | OFF | V45 | ON | ON | OFF |
| V14 | ON | ON | OFF | V46 | ON | OFF | ON |
| V15 | ON | OFF | OFF | V47 | ON | ON | OFF |
| V16 | ON | ON | OFF | V48 | ON | OFF | OFF |
| V17 | ON | OFF | ON | V49 | ON | ON | OFF |
| V18 | ON | ON | OFF | V50 | ON | OFF | OFF |
| V19 | ON | OFF | OFF | V51 | ON | ON | ON |
| V20 | ON | ON | OFF | V52 | ON | OFF | OFF |
| V21 | ON | OFF | ON | V53 | ON | ON | OFF |
| V22 | ON | ON | OFF | V54 | ON | OFF | OFF |
| V23 | ON | OFF | OFF | V55 | ON | ON | ON |
| V24 | ON | ON | OFF | V56 | ON | OFF | OFF |
| V25 | ON | OFF | ON | V57 | ON | ON | OFF |
| V26 | ON | ON | OFF | V58 | ON | OFF | OFF |
| V27 | ON | OFF | OFF | V59 | ON | ON | ON |
| V28 | ON | ON | OFF | V60 | ON | OFF | OFF |
| V29 | ON | OFF | ON | V61 | ON | ON | OFF |
| V30 | ON | ON | OFF | V62 | ON | OFF | OFF |
| V31 | ON | OFF | OFF | V63 | ON | ON | ON |

FIG.21

| Reduced-color gradation data | A/C conversion signal | Gradation voltage |
|---|---|---|
| Black 0<br>1<br>2<br>3<br>4<br>5<br>6<br>⋮<br>61<br>62<br>White 63 | 0 | Low voltage V63<br>V62<br>V61<br>V60<br>V59<br>V58<br>V57<br>⋮<br>V2<br>V1<br>High voltage V0 |
| Black 0<br>1<br>2<br>3<br>4<br>5<br>6<br>⋮<br>61<br>62<br>White 63 | 1 | High voltage V0<br>V1<br>V2<br>V3<br>V4<br>V5<br>V6<br>⋮<br>V61<br>V62<br>Low voltage V63 |

| Setting | Description | Number of colors after reduction |
|---|---|---|
| 0 | No FRC processing (no color reduction) | 262,144 |
| 1 | Perform FRC processing on lowest-order bit in 6 bits. | 32,768 |

| R | G | B | R | G | B | R |
|---|---|---|---|---|---|---|
| 0 | 1 | 0 | 1 | 0 | 1 | 0 |
| 1 | 0 | 1 | 0 | 1 | 0 | 1 |
| 0 | 1 | 0 | 1 | 0 | 1 | 0 |
| 1 | 0 | 1 | 0 | 1 | 0 | 1 |
| 0 | 1 | 0 | 1 | 0 | 1 | 0 |

Even-numbered frames

| R | G | B | R | G | B | R |
|---|---|---|---|---|---|---|
| 1 | 0 | 1 | 0 | 1 | 0 | 0 |
| 0 | 1 | 0 | 1 | 0 | 1 | 1 |
| 1 | 0 | 1 | 0 | 1 | 0 | 0 |
| 0 | 1 | 0 | 1 | 0 | 1 | 1 |
| 1 | 0 | 1 | 0 | 1 | 0 | 0 |

Odd-numbered frames

FIG.32

| Gradation data | | Bit manipulation A output | | | | | | | | | | | |
|---|---|---|---|---|---|---|---|---|---|---|---|---|---|
| | | Color reduction rate data = "0" | | | | | | Color reduction rate data = "1" | | | | | |
| MSB | LSB | MSB | | | | | LSB | MSB | | | | | LSB |
| "00000" | [Dont' Care] | 0 | 0 | 0 | 0 | 0 | 0 | 0 | 0 | 0 | 0 | 0 | 0 |
| Not-"00000" | [Dont' Care] | 0 | 0 | 0 | 0 | 0 | 0 | 0 | 0 | 0 | 0 | [Value of FRC signal] | 0 |
| *Input* | | | | | | | | *Output* | | | | | |

▨ :Dont' Care ■ :Value of FRC signal (A or B)

FIG.33

| Color reduction rate data | Subtractor output | Bit manipulation B output (reduced-color gradation data) |
|---|---|---|
| "0" | D5 D4 D3 D2 D1 D0 | D5 D4 D3 D2 D1 D0 |
| "1" | D5 D4 D3 D2 D1 D0 | D5 D4 D3 D2 D1 D5 |
| *Input* | | *Output* |

DISPLAY DEVICE AND DRIVING CIRCUIT FOR DISPLAYING

CROSS REFERENCE TO RELATED APPLICATIONS

This application is a continuation of U.S. application Ser. No. 10/372,437, filed Feb. 25, 2003, now U.S. Pat. No. 7,038,702, the contents of which are incorporated herein by reference.

BACKGROUND OF THE INVENTION

The present invention relates to a panel-type display device in which display luminance is controlled through use of an applied voltage. More specifically, the present invention relates to a technology for display devices and display device driver circuits that makes it possible to lower power consumption requirements by controlling the number of colors to be displayed.

An example of a technique that makes it possible to lower power consumption requirements by using an applied voltage to control display luminance is embodied in the display device described in "Asia display/IDW '01 proceedings" (p. 1583–1586, ITE/SID Publications). This display device performs color reduction by dithering incoming gradation data, thus simulating the number of colors in the original gradation data (hereinafter also referred to as the real color count) with a smaller number of colors. As a result, the power consumption of the device is lower than when the real color count is directly displayed.

Color reduction operations, such as dithering, generally allow selection of the degree to which the color count is reduced from the real color count (hereinafter referred to as the color reduction rate). There is less image degradation with smaller color reduction rates (close to the real color count) and more image degradation with larger color reduction rates. On the other hand, a smaller number of colors for display means that the display device circuitry has less to do, thus allowing power consumption to be reduced.

As a result, different implementations are possible depending on the usage of the display device, e.g., high-quality displays with little color reduction and low-power displays with more color reduction. However, the color reduction rates in the conventional technologies have been constant (262,144 colors to 4096 colors). Thus, the usage of this type of technology has not been considered practical.

SUMMARY OF THE INVENTION

The object of the present invention is to provide a display device and driver circuit for the same, in which the color count of an original image received from a higher-level device is reduced and the power consumption is limited based on this color count reduction, so that longer operation is possible.

The present invention allows images to be displayed using a plurality of color reduction rates and also allows color reduction rates to be selected externally through transfer of information from a higher-level device (e.g., a CPU), or by using manual setting means, such as a switch or jumper settings. To implement these features, a display device according to the present invention adds the following to a conventional display device: color reduction processing means for reducing the color count of gradation data in an original image based on color reduction rate data indicating a color reduction rate, and virtually representing the color count of the original image using the reduced color count; and means for partially stopping operations of the driver circuit based on the color reduction rate.

The present invention provides a display device and a display device driver circuit that controls display luminance based on applied voltages, wherein: color reduction rate data is received from the outside; the number of colors shown on the display is selected based on this color reduction rate data; and the operation of unnecessary driver circuits is stopped based on the number of displayed colors. As a result, the power consumed by the display device can be reduced. Also, it is possible to select between a high-quality mode with less color count reduction and a low-power mode with more color count reduction. As a result, a display device that is convenient to use can be provided.

BRIEF DESCRIPTION OF THE DRAWINGS

FIG. 4 is a table showing interface input signals in the first embodiment.

FIG. 12 is a table showing the operations performed by a dither signal selector according to the first embodiment of the present invention.

FIG. 13 is a table showing the operations performed by the bit operation module A according to the first embodiment of the present invention.

FIG. 14 is a table showing the operations of the bit operation module B according to the first embodiment of the present invention.

FIG. 15 is a table showing the operations of the dither processing module of the first embodiment of the present invention.

FIG. 16 is a diagram illustration operations performed by the dither processing module according to the first embodiment of the present invention.

FIG. 18 is a table illustrating the operation of the gradation voltage generating module according to the first embodiment of the present invention.

FIG. 21 is a table illustrating the operations of a selector according to the first embodiment of the present invention.

FIG. 32 is a table illustrating the operations of the bit operation module A according to the second embodiment of the present invention.

FIG. 33 is a table illustrating the operation of the bit operation module B according to the second embodiment.

DETAILED DESCRIPTION OF THE PREFERRED EMBODIMENTS OF THE INVENTION

Various embodiments of the present invention will be described in detail with reference to the drawings. A first embodiment of the present invention will be described initially with reference to FIG. 1 through FIG. 23.

Figures 1, 2:
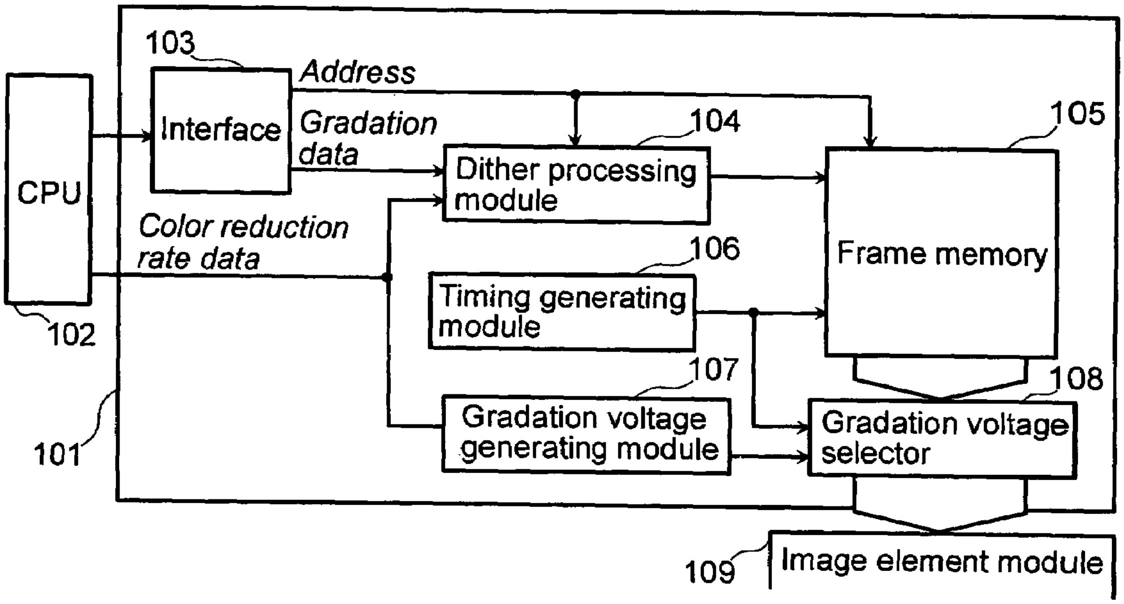
FIG. 1 is a block diagram of a display device driver circuit according to a first embodiment of a display device of the present invention.
FIG. 2 is a table showing interface input signals according to the first embodiment of the present invention.
Figure 3:
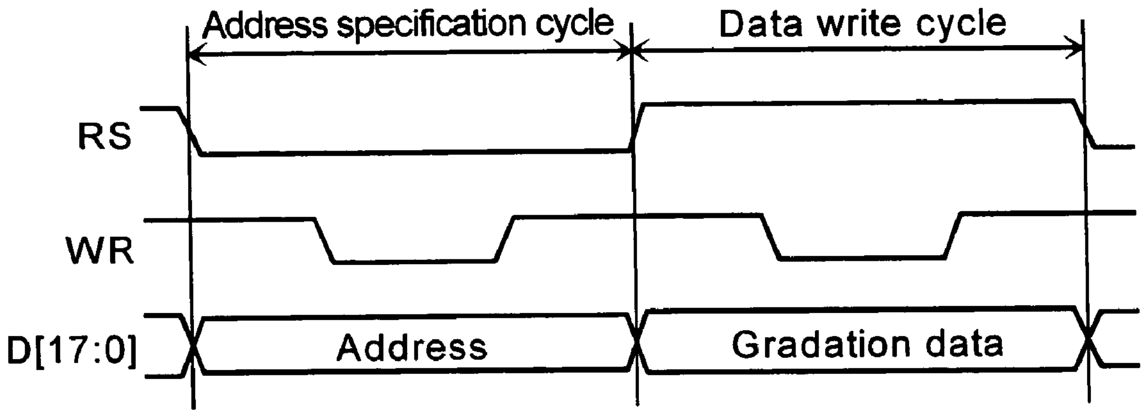
FIG. 3 is a timing chart illustrating the operations of the interface input signals according to the first embodiment of the present invention.

FIG. 1 is a block diagram of a display device driver circuit according to a first embodiment of a display device of the present invention. FIG. 1 shows: a data line driver 101; a CPU 102; an interface 103; a dither processing module 104; a frame memory 105; a timing generating module 106; a gradation voltage generating module 107; a gradation voltage selector; and an pixel module 109. FIG. 2 is a table showing interface input signals according to the first embodiment of the present invention. FIG. 3 is a timing chart illustrating the operations of the interface input signals according to the first embodiment of the present invention.

In this embodiment of the present invention, the pixel module 109 can be, for example, a TFT liquid crystal. A gradation voltage based on gradation data is output by the data line driver module 101 to the pixel module 108 to provide for generation of a multi-color display. In this embodiment, the gradation data received by the display device is digital data with six-bits each assigned to R (red), G (green), B (blue). One pixel has color information corresponding to 262, 144 colors.

First, the operations performed by the data line driver module 101 will be described. A signal relating to data display is sent by the CPU 102 to the data line driver module 101. This signal includes gradation data indicating how concentrated the colors are, an address indicating a display position, and color reduction rate data, which is a characteristic of the present invention. The signals used by the CPU 102 and the interface 103 are shown in FIG. 2, and they include an RS signal for selecting address/gradation data, a WR signal for instructing a write operation, and a D signal containing the actual address/gradation data values.

As shown in FIG. 3, these signals involve an address cycle and a gradation data write cycle. For example, in the addressing cycle, the D signal is set to a predetermined address when the RS signal is "low". Then, the operation is executed when the WR signal is set to "low". In the gradation data write cycle, the RS signal is "high" and the D signal is set to a predetermined gradation data value. Then, when the WR signal is set to "low", the operation is executed. These operations are programmed ahead of time in application software and the operating system used to control the entire device. Next, a description of the D signal will be provided with reference to FIG. 4.

Figures 5, 6:
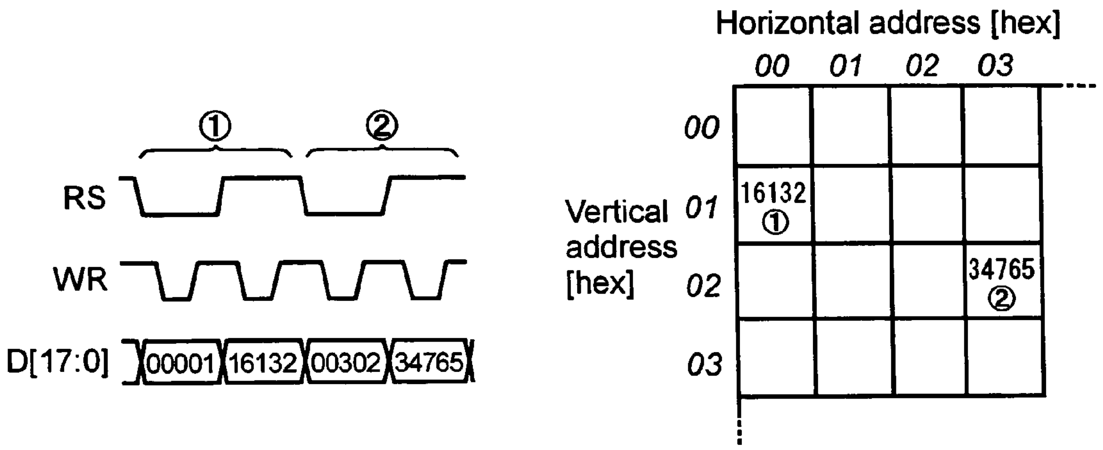
FIG. 5 is a diagram showing interface input signals according to the first embodiment of the present invention.
FIG. 6 is a table of color reduction rate data according to the first embodiment of the present invention.

FIG. 4 is a table showing the interface input signals in the first embodiment. As shown in FIG. 4, the D signal, which is used for the actual address/gradation data values, is an 18-bit signal. In addressing cycles, the D signal contains the horizontal and vertical addresses (8 bits each), and, in gradation data write cycles, the D signal contains the RGB gradation data (6 bits each). FIG. 5 is a diagram showing the interface input signals according to the first embodiment of the present invention. A sample image transferred by this interface is shown. The interface 103 decodes the display signal transferred from the CPU and outputs addresses and gradation data separately.

FIG. 6 is a table showing color reduction rate data according to the first embodiment of the present invention. The dithering processing module 104 in FIG. 1 receives gradation data, addresses, and color reduction rate data, performs color reduction through dithering, and outputs the results as reduced-color gradation data. The color reduction rate data is 2-bit data that can indicate three color reduction rates. As shown in FIG. 6, the value indicates how many bits of the RGB gradation data input (6 bits each) are to be dithered.

Figure 7:
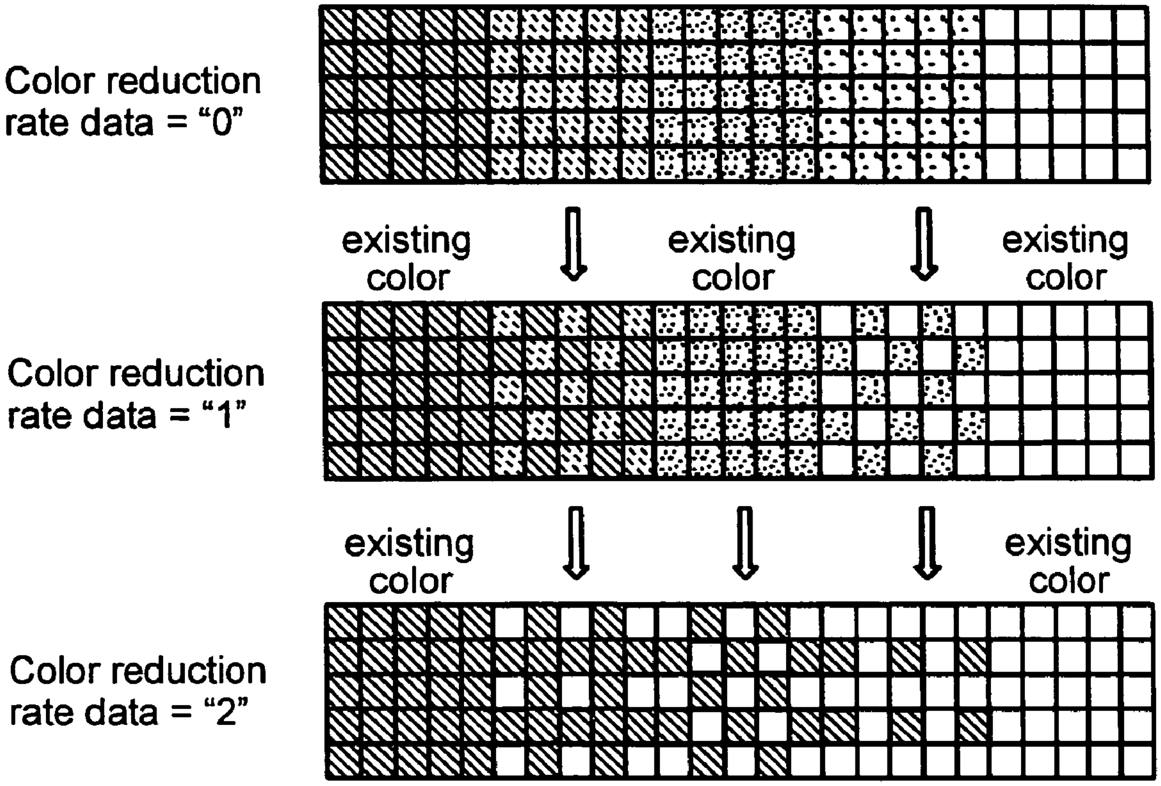
FIG. 7 is a diagram illustrating the principles involved in the dithering system of the first embodiment of the present invention.

FIG. 7 is a diagram illustrating the principles involved in the dithering system of the first embodiment of the present invention. Dithering is a technique in which existing colors are combined in space to generate intermediate colors. FIG. 7 shows sample images corresponding to the different color reduction rates. Next, the structure and operations of the dither processing module 104 will be described with reference to FIG. 8 through FIG. 14.

Figures 8, 9:
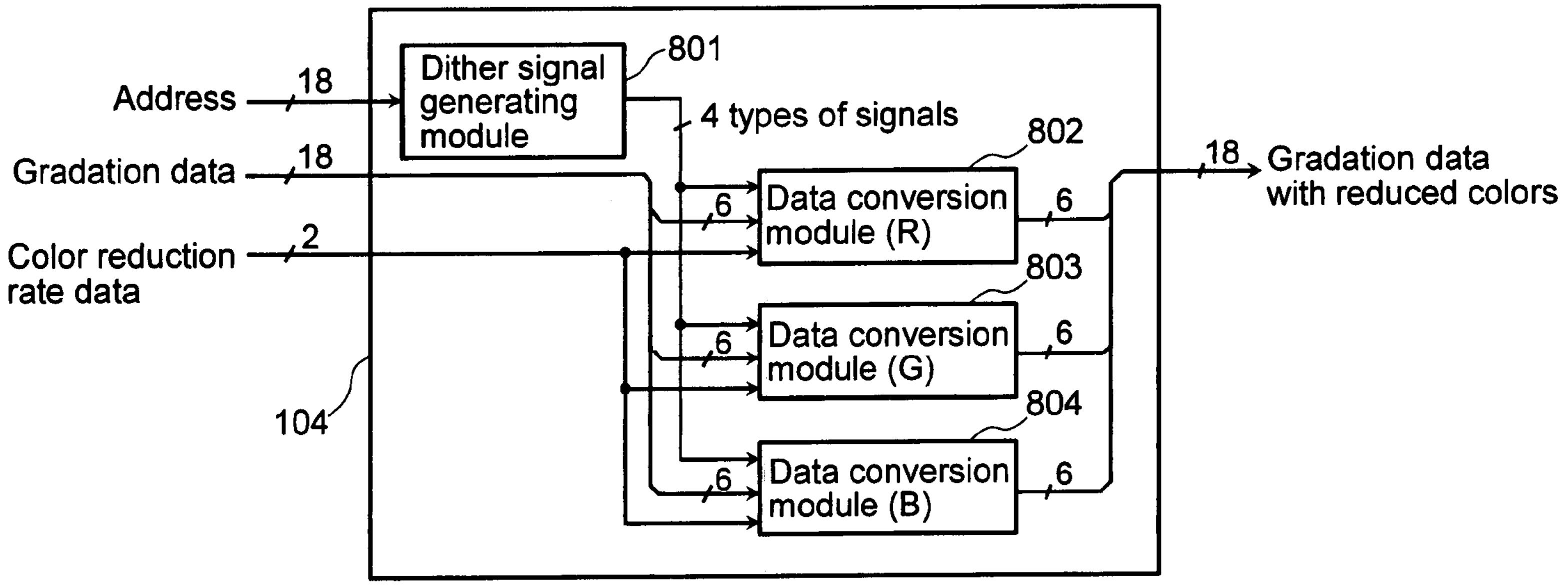
FIG. 8 is a block diagram showing the structure of a dither processing module according to the first embodiment of the present invention.
FIG. 9 is a table showing the operations performed by a dither signal generating module according to the first embodiment of the present invention.

FIG. 8 is a block diagram showing the structure of a dither processing module according to the first embodiment of the present invention. FIG. 9 is a table illustrating the operations performed by a dither signal generating module according to the first embodiment of the present invention. In FIG. 8, the dither processing module 104 includes a dither signal generating module 801 and R, G, B data conversion modules 802, 803, 804. As shown in FIG. 9, the dither signal generating module 801 generates four types of dither signals A–D based on the lowest bit of the received horizontal and vertical addresses.

Figure 10:
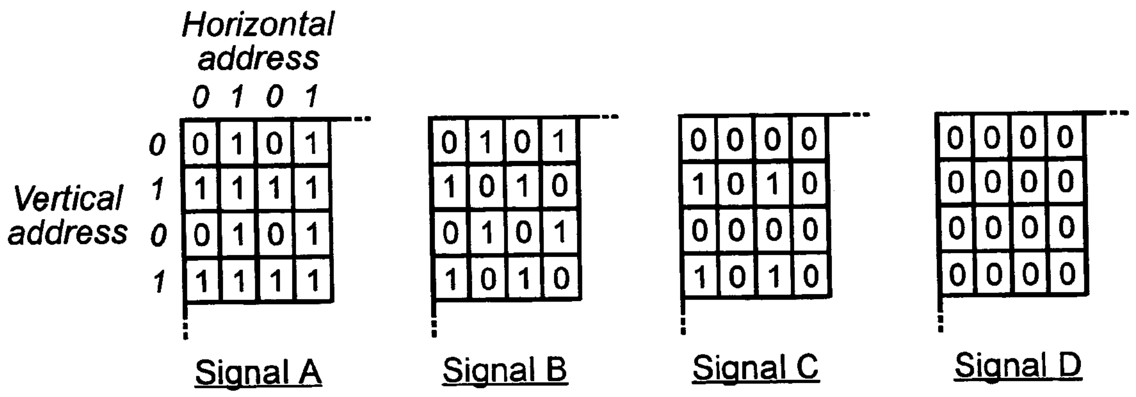
FIG. 10 is a diagram illustrating operations performed by the dither signal generating module according to the first embodiment of the present invention.
Figure 11:
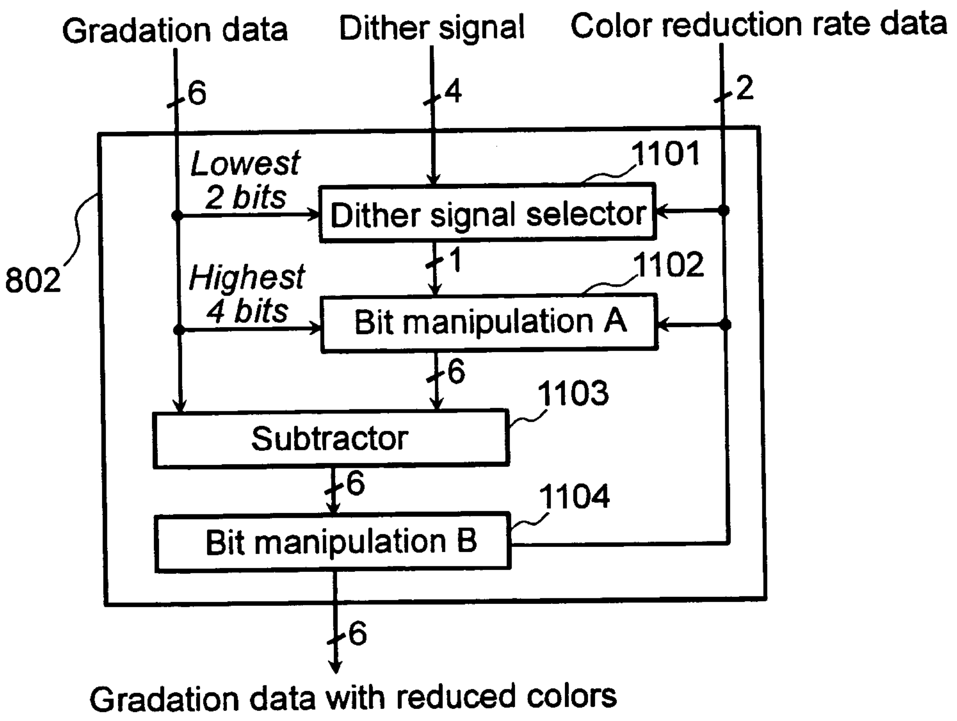
FIG. 11 is a block diagram showing the structure of the data converter according to the first embodiment of the present invention.

FIG. 10 is a diagram showing operations performed by the dither signal generating module according to the first embodiment of the present invention. FIG. 10 shows dither signal values corresponding to an actual screen. This example is equivalent to the combination patterns of existing colors shown in FIG. 7. FIG. 11 is a block diagram showing the structure of the data converter according to the first embodiment of the present invention. As shown in FIG. 11, the data converter 802 includes a dither signal selector 1101, a bit operation module A 1102, a subtractor 1103, and a bit operation module B 1104. FIG. 11 simply shows "bit operation A" and "bit operation B".

FIG. 12 is a table illustrating the operations performed by a dither signal selector according to the first embodiment of the present invention. The dither signal selector 1101 in FIG. 11 selects and outputs one signal out of the dither signals A–D based on the lowest two bits of the 6-bit gradation data. The selected dither signal varies according to the color reduction rate data. This relationship is shown in FIG. 12.

FIG. 13 is a table showing the operations performed by the bit operation module A according to the first embodiment of the present invention. The bit operation module A 1102 adds a "0" to the selected dither signal to generate 6-bit data, but how the "0" gets added differs depending on the color reduction rate data. This relationship is shown in FIG. 13. The purpose of this bit operation is to simplify the subtraction operation performed at the next step. Also, the output value from the bit operation module A is varied based on the higher level bit values of the gradation data to prevent the subtraction result from becoming negative.

FIG. 14 is a table illustrating the operations of the bit operation module B according to the first embodiment of the present invention. FIG. 15 is a table illustrating the operations of the dither processing module of the first embodiment of the present invention. The subtractor 1103 subtracts the output of the bit operation module A from the gradation data and outputs the result. As shown in FIG. 14, the bit operation module B 1104 rearranges the gradation data bits based on the color reduction rate data, and the results are output as the reduced-color gradation data. With this dithering operation, the gradation data input is converted to the reduced-color gradation data shown in FIG. 15. In FIG. 15, the crosshatched sections indicate that two gradation data values are possible depending on the display position. For example, at the field marked "12&14", a gradation data value of 12 or 14 can be assigned depending on the display position. Next, a specific example of this dithering operation that involves an actual screen will be described.

FIG. 16 is a table illustrating operations performed by the dither processing module according to the first embodiment of the present invention. FIG. 16 shows that the conversion from the gradation data to the reduced-color gradation data is equivalent to the color reduction performed using dithering on 2×2 pixel units. Another well known color reduction method is the error diffusion method, and this method can also be used. The error diffusion method provides higher-quality color reduction compared to dithering, but larger circuits are required. Thus, it would be desirable to use the different methods selectively according to the application.

Figure 20:
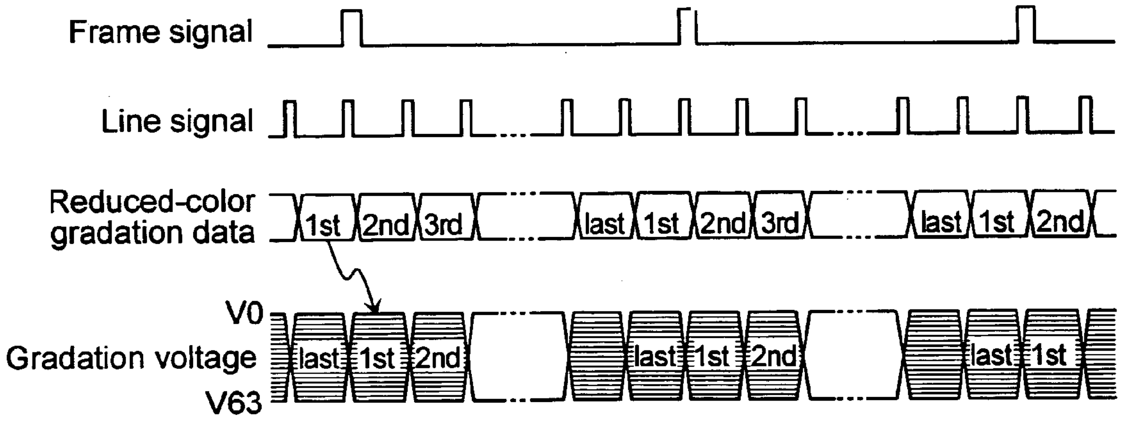
FIG. 20 is a timing chart illustrating the operations performed by the gradation voltage selector according to the first embodiment of the present invention.

Next, the frame memory 105 stores the reduced-color gradation data at an address based on the address transferred by the interface 103. The frame memory 105 can be formed using a standard SRAM. The timing generating module 106 generates timing signals, to be described later, and sends these signals to the frame memory 105 and the gradation voltage selector 108. These timing signals include frame memory read control signals. Based on these control signals, reduced-color gradation data is read from the frame memory 105 one line at a time starting from the first line on the screen. After the final line, the first line is read again and this operation is repeated. The timing for switching read lines is synchronized with the line signal provided by the timing generating module 106. The timing for selecting the word line for the first line is synchronized with the frame signal provided by the timing generating module 107. The specific timings for these are shown in FIG. 20, to be described later.

Figure 17:
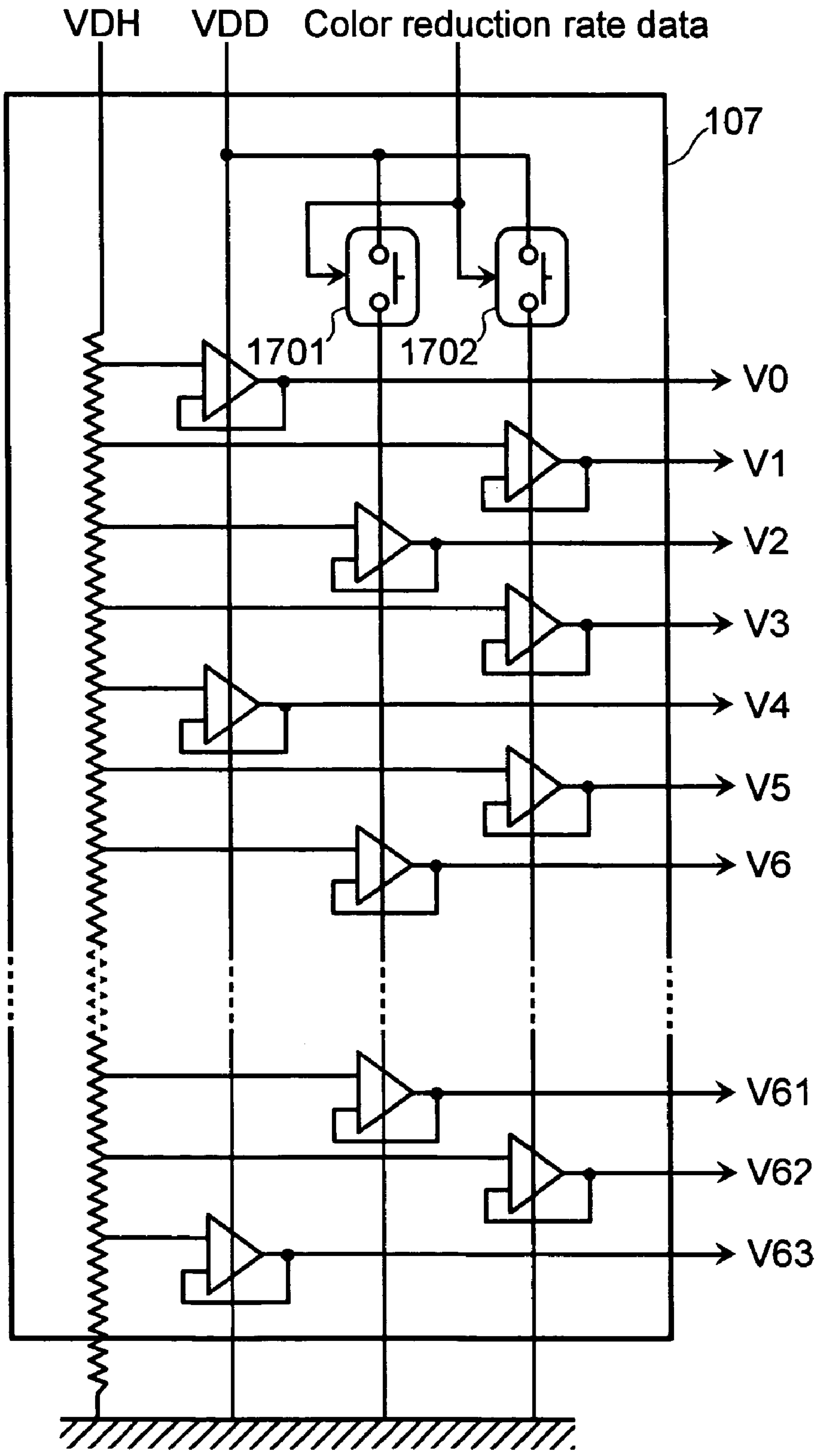
FIG. 17 is a circuit diagram showing the structure of the gradation voltage generating module according to the first embodiment of the present invention.

FIG. 17 is a circuit diagram showing the structure of the gradation voltage generating module according to the first embodiment of the present invention. The gradation voltage generating module 107 is a circuit block that generates the gradation voltages needed for converting gradation data to voltage levels. FIG. 17 shows the internal structure of this block. In FIG. 17, the voltages VDH and VDD are provided from the outside. VDH is a reference voltage for generating gradation voltages. VDD is a power source voltage for operational amplifiers.

First, 64 levels T of gradation voltages V0–V63 are generated by performing resistance-division of the reference voltage VDH, and these gradation voltages are buffered by operational amplifiers in a voltage follower circuit. As shown in FIG. 17, the power supply to the operational amplifiers is controlled by a switch 1701 and a switch 1702, which use the color reduction rate data as a control signal.

FIG. 18 is a table illustrating the operation of the gradation voltage generating module according to the first embodiment of the present invention. The power supply states for the operational amplifiers are shown for each of the color reduction rates. In FIG. 18, the crosshatched fields indicate where the operational amplifier power is off, and the other fields indicate where the power is on. Looking at the powered operational amplifier groups for each color reduction rate, the gradation voltage numbers that are buffered by these are the same as the reduced-color data groups shown in FIG. 15. This is because the color-reduction gradation data and the gradation voltage numbers are intentionally matched up. As a result, power can be supplied only to the operational amplifiers to be used. Looking again at FIG. 15, the gradation voltages V0, V63 are used for all color-reduction rates, and the other gradation values are levels that result from dividing up V0 and V63 as evenly as possible. This was done to maximize the display contrast (dynamic range) for all the color-reduction rates. The gradation voltage selector 108 is a circuit block that selects and outputs one level out of the multiple gradation voltages based on the color-reduction gradation data.

Figure 19:
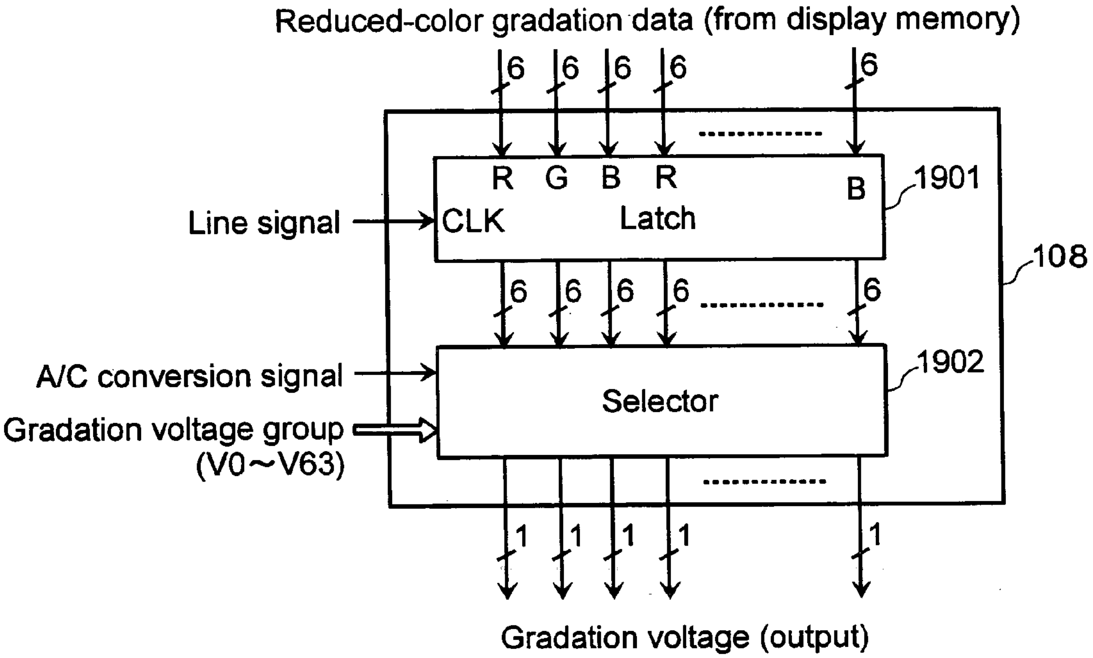
FIG. 19 is a block diagram showing the structure of a gradation voltage selector according to the first embodiment of the present invention.

FIG. 19 is a block diagram showing the structure of a gradation voltage selector according to the first embodiment of the present invention. FIG. 20 is a timing chart illustrating the operations performed by the gradation voltage selector according to the first embodiment of the present invention. FIG. 21 is a table illustrating the operations of a selector according to the first embodiment of the present invention. The gradation voltage selector is formed from a latch module 1901 and a selector 1902. The latch module 1901 captures one line of color-reduction gradation data output from the frame memory 105 using the line signal and outputs this data to the selector 1902. The selector 1902 selects one level out of the multiple gradation voltages based on the color-reduction gradation data and the AC conversion signal.

Figure 22:
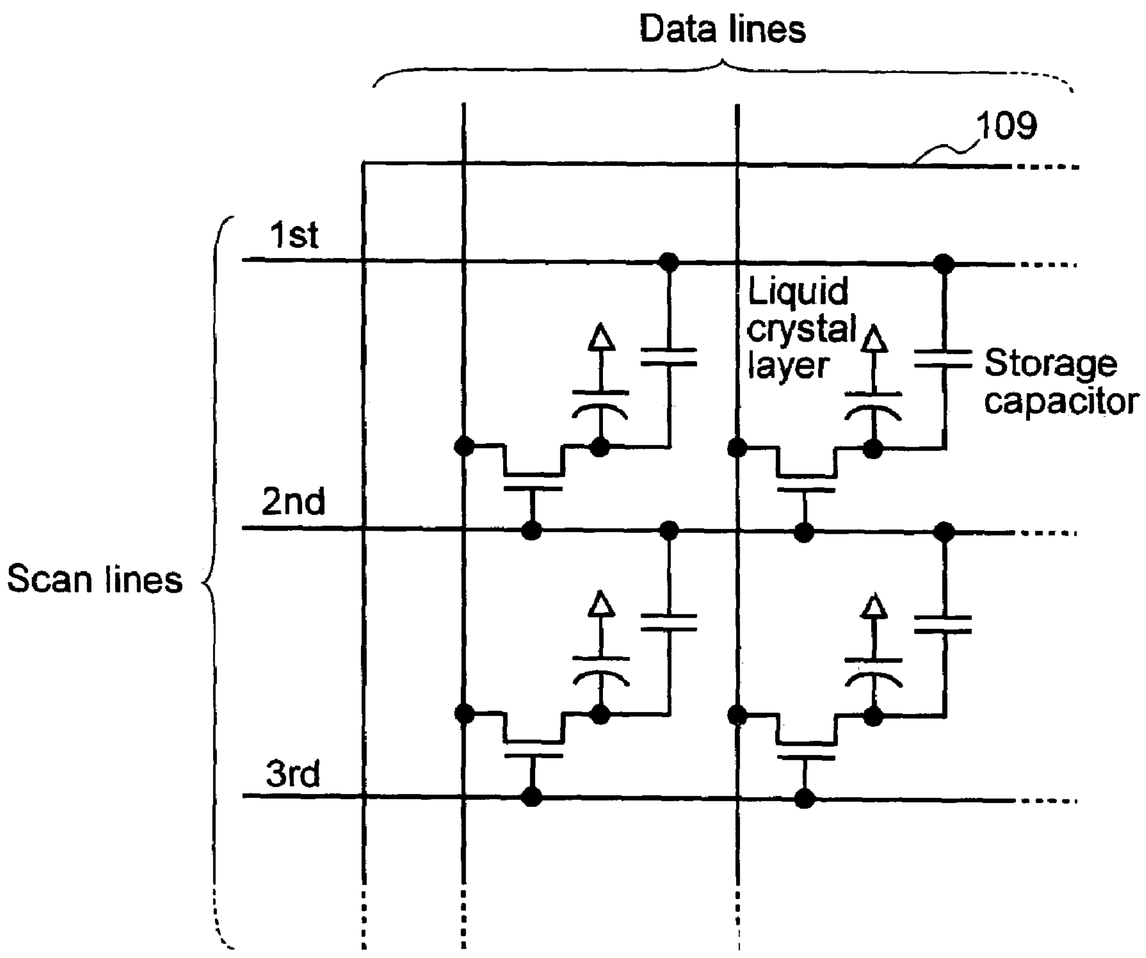
FIG. 22 is an equivalent circuit diagram illustrating the structure of the pixel module according to the first embodiment of the present invention.

FIG. 22 is an equivalent circuit diagram illustrating the structure of the pixel module according to the first embodiment of the present invention. The pixel module is formed from three-terminal thin-film transistor TFT elements, a liquid crystal layer, and storage capacitors. The drain terminal of the thin-film transistor TFT element is connected to a data line, the gate terminal is connected to a scan line, and the source terminal is connected to a liquid crystal cell and a storage capacitor. On the opposite side of the liquid crystal layer is a shared common electrode that is electrically connected to the liquid crystal layer. The other end of the storage capacitor is connected to the scan line from the previous level. One way to implement this structure is to form the data lines and the scan lines on one of the inner surfaces of two transparent substrates interposed by liquid crystal. The common electrode is formed tightly against the other inner surface. The pixels in this embodiment use the "Cadd" structure, but it would also be possible to use "Cst" structures, in which storage capacitor terminals are connected to storage lines.

The display device driver circuit 101 of the present invention is connected to the data lines of the pixel module 109 described above, and desired gradation voltages are sent to the different data lines. Implementing an actual display device also requires a scan line driver module and a power supply circuit, but these can be the same as existing circuits. This is illustrated in FIG. 23.

Figure 23:
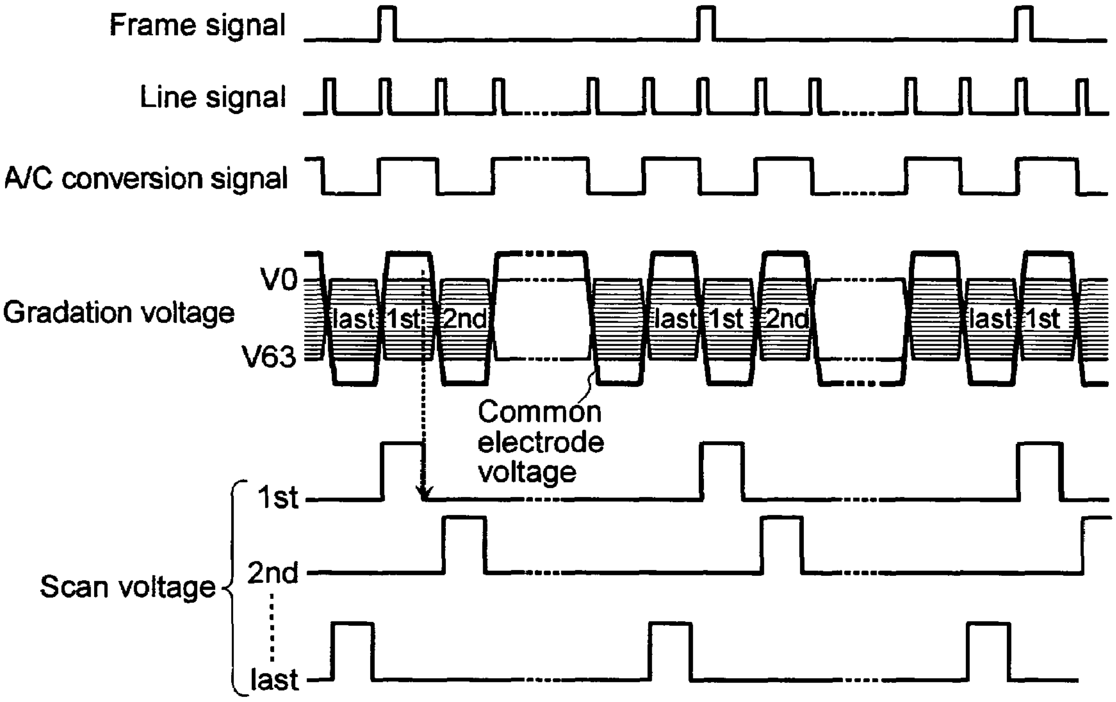
FIG. 23 is a timing chart that illustrates the operations performed in the peripheral circuits according to the first embodiment of the present invention.

FIG. 23 is a timing chart that illustrates the operations performed in the peripheral circuits according to the first embodiment of the present invention. For example, as shown in FIG. 23, the scan line driver module sends a "high" voltage to the first scan line in sync with the frame signal. Then, "high" voltages are sent sequentially to the following scan lines in sync with the frame signal. The switch from "high" voltage to "low" voltage takes place right before the switching of the gradation voltage, and the gradation voltage level corresponds to the gradation data for the particular scan line. The scan line driver module can also be easily implemented by using a shift-register circuit.

The common voltage, which is the voltage applied to the common electrode, has a waveform that is synchronized with an AC signal, and this can be implemented with a circuit that adjusts the amplitude of the AC signal. The polarity of the voltage applied to the liquid crystal can be considered as the polarity of the gradation voltage as seen from the common voltage, with the voltage to the liquid crystal being inverted in sync with the AC signal. This operation is equivalent to a "common inversion" system. While a common inversion system is used in the first embodiment as an example, the present invention is not restricted to this, and it would also be easy to use a dot inversion system or a row inversion system. Also, this embodiment is directed to a TFT liquid crystal display device, but the present invention is not restricted to this. It would also be possible to implement the present invention for other displays that control display luminance with voltage levels, e.g., organic EL displays. Also, it would be desirable to form the data line driver module of the first embodiment as an LSI chip.

As described above, the first embodiment of the present invention switches the number of colors to be displayed based on color reduction rate data and stops the operation of those driver circuits that are not needed for the displayed color count. As a result, the display device can consume less power. Also, the display can be made easier to use by providing a high-quality mode with little color reduction and a low-power mode with more color reduction. For example, the display device and the display device driver circuit of the present invention can be used as the display in a mobile telephone device so that a low-power mode with more color reduction can be used in the stand-by mode, while a high-quality mode with less color reduction can be used when viewing video, natural images, and the like, This selection can be performed automatically by having the CPU monitor the operation state of the terminal device, or it can be performed manually by the user using terminal setting means or the like.

Next, a second embodiment of the present invention will be described with reference to FIG. 24 through FIG. 33. In the first embodiment of the present invention, as described above, dithering is used to provide color reduction. In contrast, the second embodiment of the present invention uses FRC to reduce colors. FRC is an acronym for "frame rate control". In FRC, existing colors are combined both spatially and temporally to generate intermediate colors, as shown in FIG. 25. Compared to the dithering method described above, intermediate colors can be expressed without sacrificing resolution.

Figure 24:
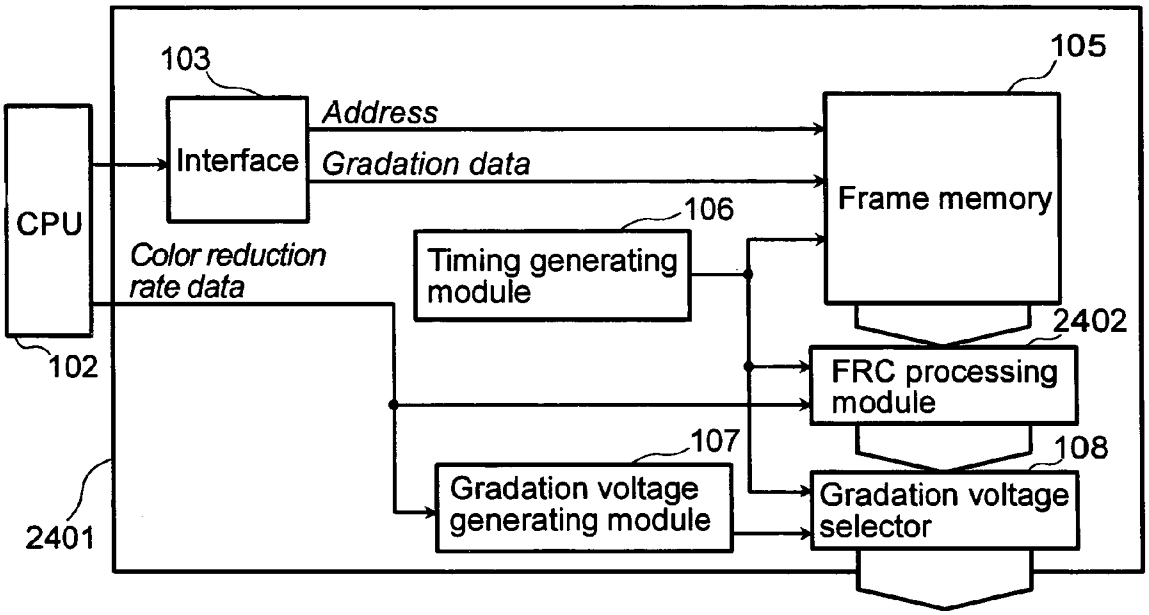
FIG. 24 is a block diagram showing the structure of a display device driver circuit according to the second embodiment of the display device of the present invention.
Figures 25, 26:
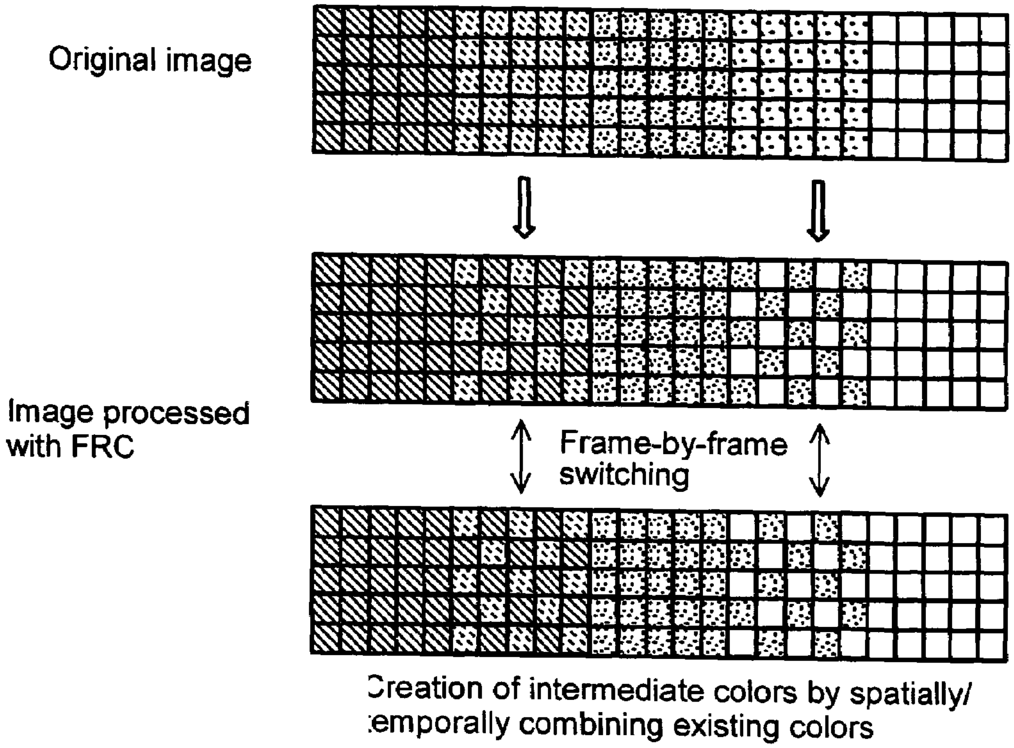
FIG. 25 is a diagram illustrating principles involved in an FRC system according to the second embodiment of the present invention.
FIG. 26 is a table illustrating color reduction rate data according to the second embodiment of the present invention.

FIG. 24 is a block diagram showing the structure of a display device driver circuit according to the second embodiment of the display device of the present invention. FIG. 25 is a diagram illustrating principles involved in an FRC system according to the second embodiment of the present invention. FIG. 26 is a table illustrating color reduction rate data according to the second embodiment of the present invention. FIG. 24 shows a data line driver circuit 2401 and an FRC processing module 2402. The other blocks are identical to those from the first embodiment of the present invention and are assigned the same numerals. The major difference between the data line driver circuit 2401 of this embodiment and the data line driver circuit 101 of the first embodiment of the present invention is that, in the FRC system, the read operations from the frame memory 105 and the color reduction operations must be synchronized in order to switch displayed images for each frame interval (i.e., the scan time for a single screen).

Thus, the FRC processing module 2402 performs FRC processing based on the received color reduction rate data for all gradation data in the lines that are read sequentially from the frame memory 105, and the results are output to the gradation voltage selector 108. In this embodiment, the color reduction rate data is a 1-bit value that indicates one of two types of color reduction rates, and, as shown in FIG. 26, this value indicates the number of bits out of the RGB gradation data (6 bits each) on which to perform FRC processing.

Figure 27:
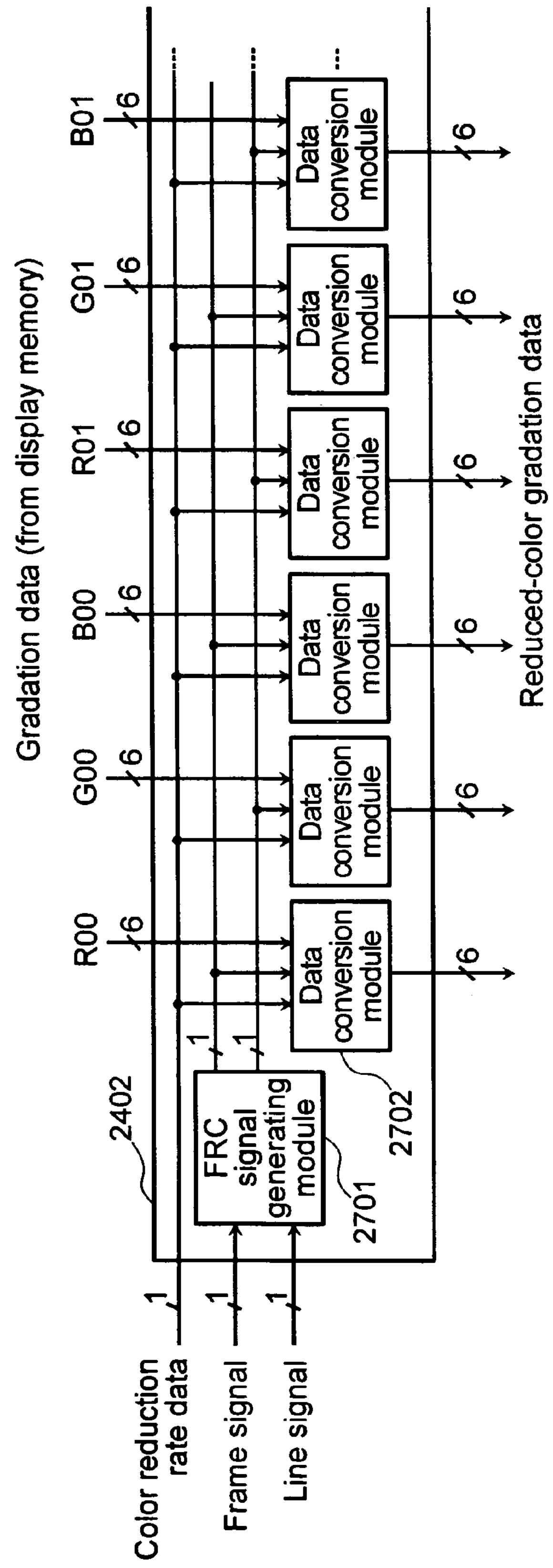
FIG. 27 is a block diagram showing the structure of an FRC processing module according to the second embodiment of the present invention.
Figure 28:
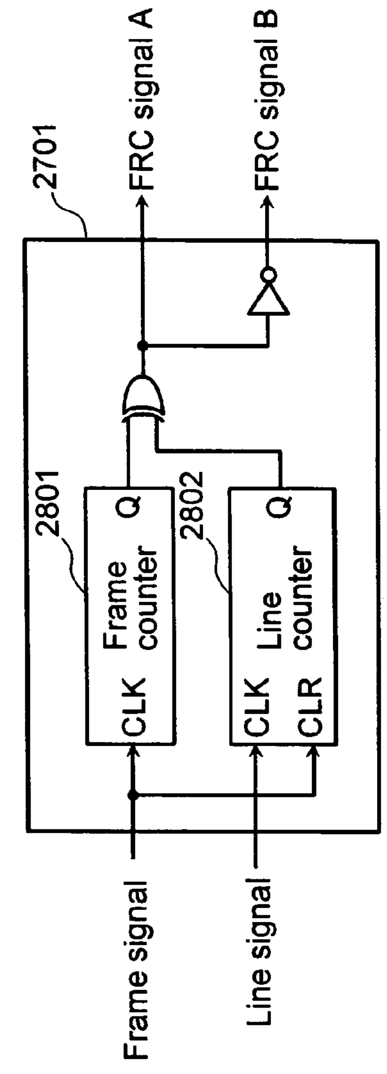
FIG. 28 is a block diagram showing the structure of an FRC signal generating module according to the second embodiment of the present invention.
Figures 29, 30:
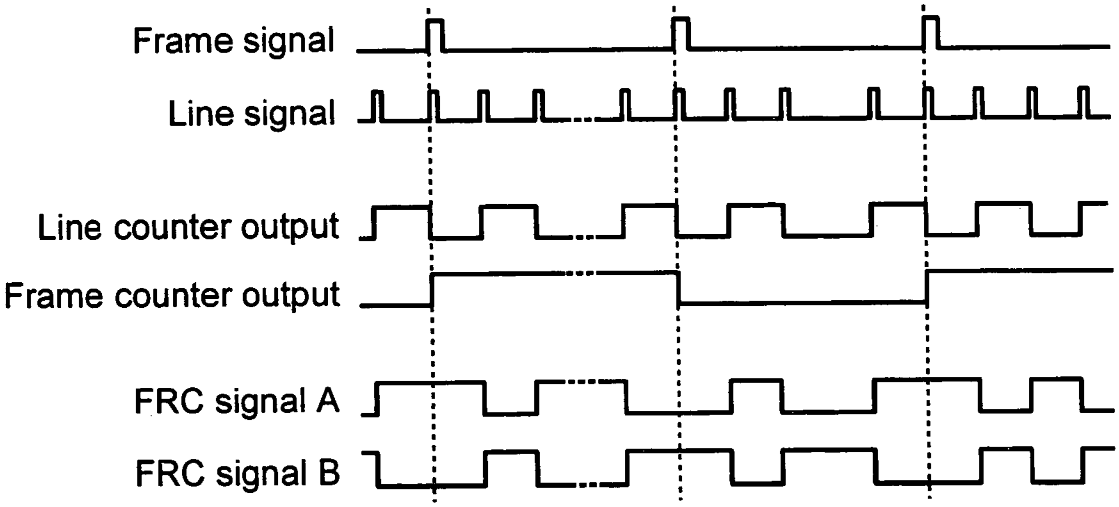
FIG. 29 is a timing chart illustrating the operations performed by the FRC signal generating module according to the second embodiment of the present invention.
FIG. 30 is a diagram illustrating the operations performed by the FRC signal generating module according to the second embodiment.
Figure 31:
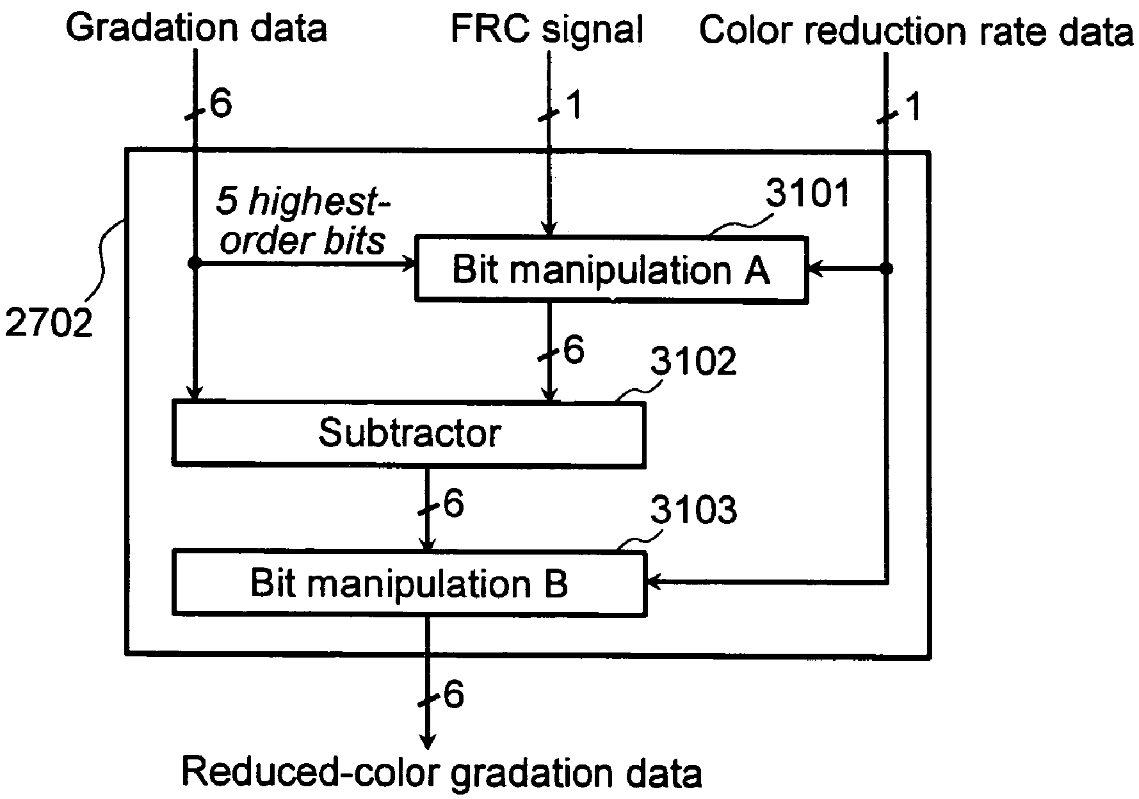
FIG. 31 is a block diagram showing the structure of a data conversion module according to the second embodiment of the present invention.

FIG. 27 is a block diagram showing the structure of an FRC processing module according to the second embodiment of the present invention. FIG. 28 is a block diagram showing the structure of an FRC signal generating module according to the second embodiment of the present invention. FIG. 29 is a timing chart illustrating the operations performed by the FRC signal generating module according to the second embodiment of the present invention. FIG. 30 is a diagram illustrating the operations performed by the FRC signal generating module according to the second embodiment. FIG. 31 is a block diagram showing the structure of a data conversion module according to the second embodiment of the present invention. FIG. 27 shows an FRC signal generating module 2701 and a data conversion module 2702. As shown in FIG. 28, the FRC signal generating module 2701 generates two types of FRC signals from a frame signal and a line signal transferred from the timing generating module 106. The timing charts for these are shown in FIG. 29.

As shown in FIG. 27, the two FRC signals are connected to data conversion modules in an alternating manner. The FRC signal values corresponding to the actual screen are arranged as shown in FIG. 30. This is equivalent to the pattern of combining existing colors as shown in FIG. 25. As shown in FIG. 31, the data conversion module 2702 is formed from a bit operation module A 3101, a subtracter 3102, and a bit operation module B 3103. The bit operation module A 3101 is converted to 6 bits by adding a “0” to the FRC signal, but how the “0” is added differs depending on the color reduction rate data.

FIG. 32 is a table illustrating the operations of the bit operation module A according to the second embodiment of the’ present invention. FIG. 33 is a table illustrating the operation of the bit operation module B according to the second embodiment. FIG. 32 illustrates how the “0” is added to the FRC signal to form 6 bits as described above. The object of this bit operation is to make subtraction operations easier at the next step. Also, the output value of the bit operation module A is changed depending on the highest bit of the gradation data, so that the subtraction results do not come out negative.

Next, the subtracter 3102 subtracts the output from the bit operation module A from the gradation data. Then, the bit operation module B 3103 rearranges the gradation data bits based on the color reduction rate data, as shown in FIG. 33, and the results are output as the reduced-color gradation data.

By performing this FRC operation all at once for an entire line of gradation data, FRC color reduction based on ×2 pixel units is possible. In this embodiment, FRC processing is performed on the lowest bit in the 6-bit gradation data. The present invention is not restricted to this, however, and it would of course also be possible to apply FRC to the two lowest bits.

Other blocks execute functions identical to the blocks shown in the first embodiment of the present invention, and so overlapping descriptions will be omitted.

As in the first embodiment of the present invention, the second embodiment of the present invention, as described above, switches the number of colors to be displayed based on color reduction rate data and stops the operation of driver circuits that are not needed for the displayed color count, As a result, the display device can consume less power. Also, the display can be made easier to use by providing a high-quality mode with little color reduction and a low power mode with more color reduction. Furthermore, since FRC is used for color reduction, intermediate colors can be expressed without sacrificing resolution.

Figure 34:
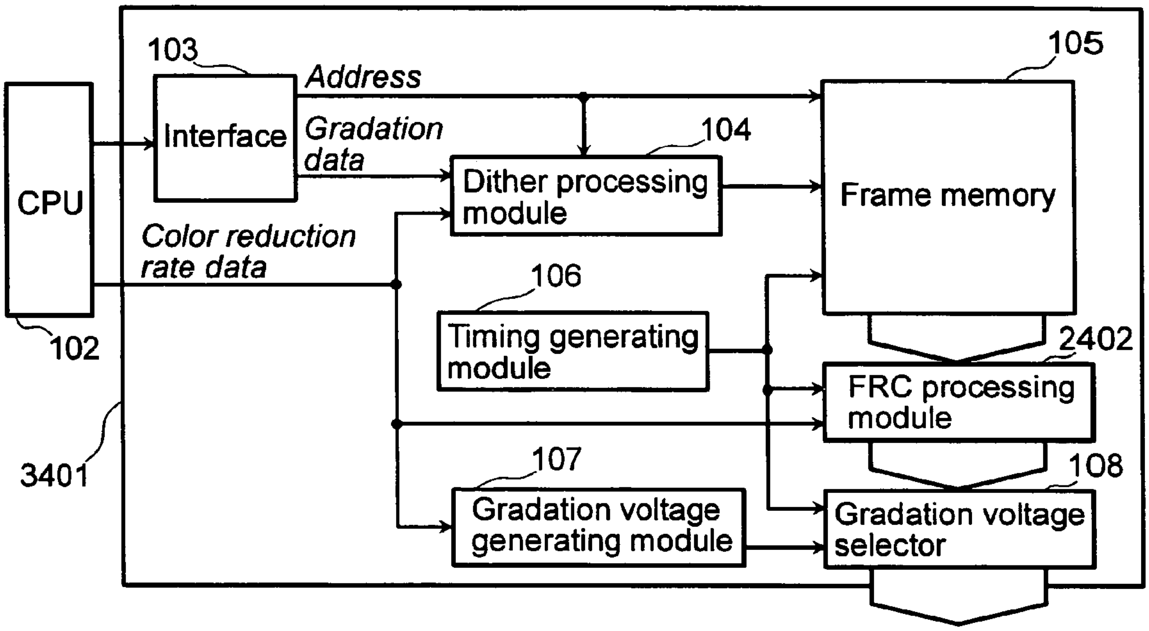
FIG. 34 is a block diagram showing the structure of a display device driver circuit according to the second embodiment of the present invention.
Figure 35:
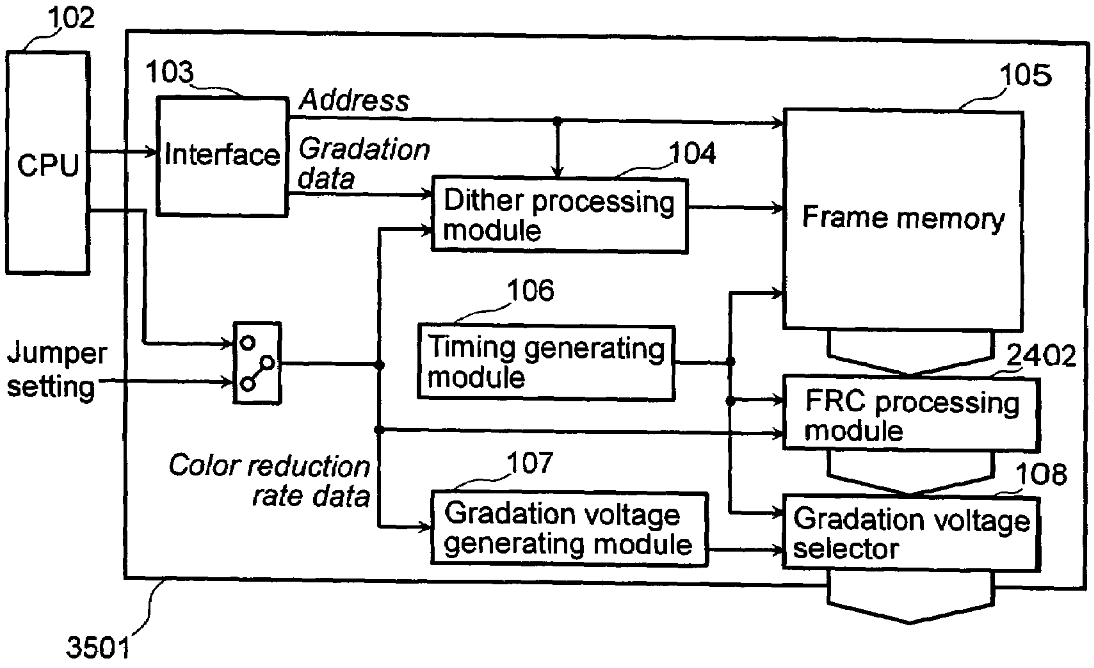
FIG. 35 is a block diagram showing the structure of a display device driver circuit according to the second embodiment of the present invention.

FIG. 34 is a block diagram showing the structure of a display device driver circuit according to the second embodiment of the present invention. As shown in FIG. 34, it is possible to implement a display device driver circuit equipped with both dither processing and FRC processing. In this case, it would be possible to use just dither processing or FRC processing, or to use both in combination. This can be achieved by having the color reduction rate data provided separately for both dither processing and FRC processing. Furthermore, the present invention is not restricted to transferring color reduction data from the CPU, and it would also be possible to use jumper settings. Also, as shown in FIG. 35, it would be possible to select between CPU transfer and jumper settings.

Next, a third embodiment of the present invention will be described with reference to FIG. 36 through FIG. 41. In the first and the second embodiments of the present invention, display signals are transferred to the CPU, and the display device driver circuit is equipped with its own frame memory. This structure is frequently used in compact displays, such as mobile phone displays. In contrast, the third embodiment of the present invention, which is described below, transfers display signals from a dedicated graphic controller, and the display device driver circuit is not equipped with a frame memory. This structure is frequently used in large displays.

Figure 36:
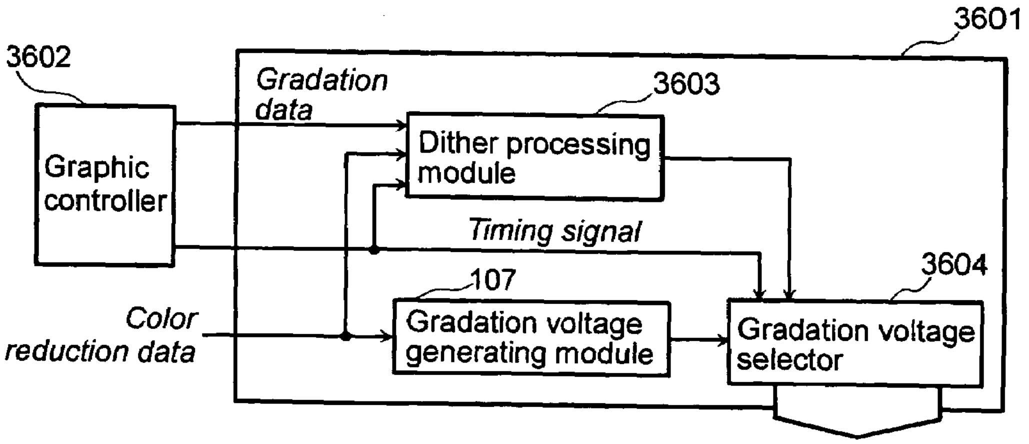
FIG. 36 is a block diagram showing the structure of a display device driver circuit according to the third embodiment of the display device of the present invention.
Figure 37:
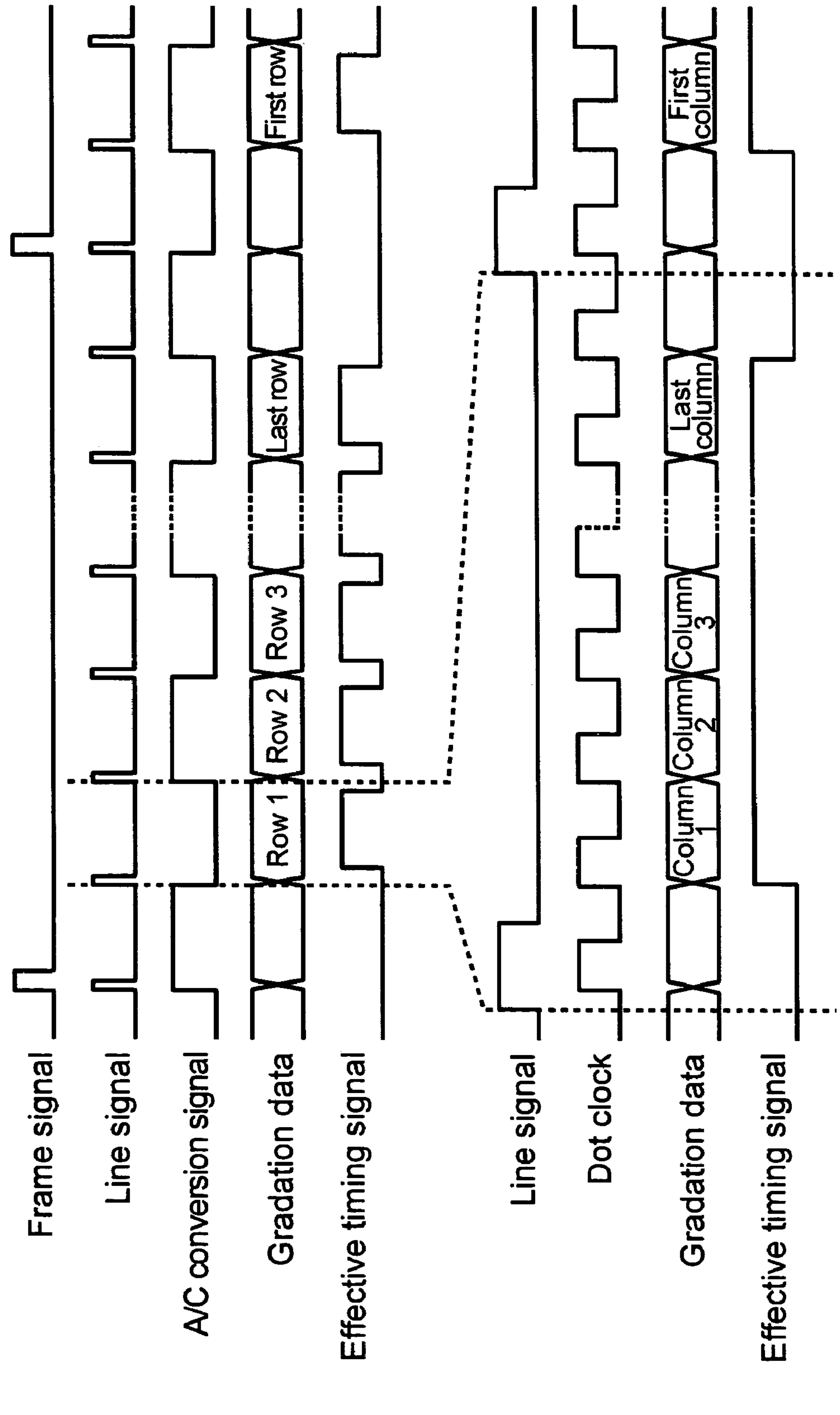
FIG. 37 is a timing chart of input signals in the third embodiment of the present invention.

FIG. 36 is a block diagram showing the structure of a display device driver circuit according to the third embodiment of the display device of the present invention. FIG. 37 is a timing chart showing input signals in the third embodiment of the present invention. FIG. 36 shows a data line driver module 3601, a graphic controller 3602, a dither processing module 3603, and a gradation voltage selector 3604. The gradation voltage generating module 107 is identical to the gradation voltage generating modules used in the first embodiment and the second embodiment of the present invention.

The graphic controller 3602 outputs gradation data and display sync signals, as shown in FIG. 37, to serve as “raster scan” display signals. The dither processing module 3603 receives these display sync signals, gradation data, and color reduction rate data, applies dithering to perform color reduction on the gradation data, and outputs the reduced-color gradation data. The color reduction rate data here can be provided from an external CPU, it can be set from jumpers, it can be set from manual switches on the device, or the like.

Figure 38:
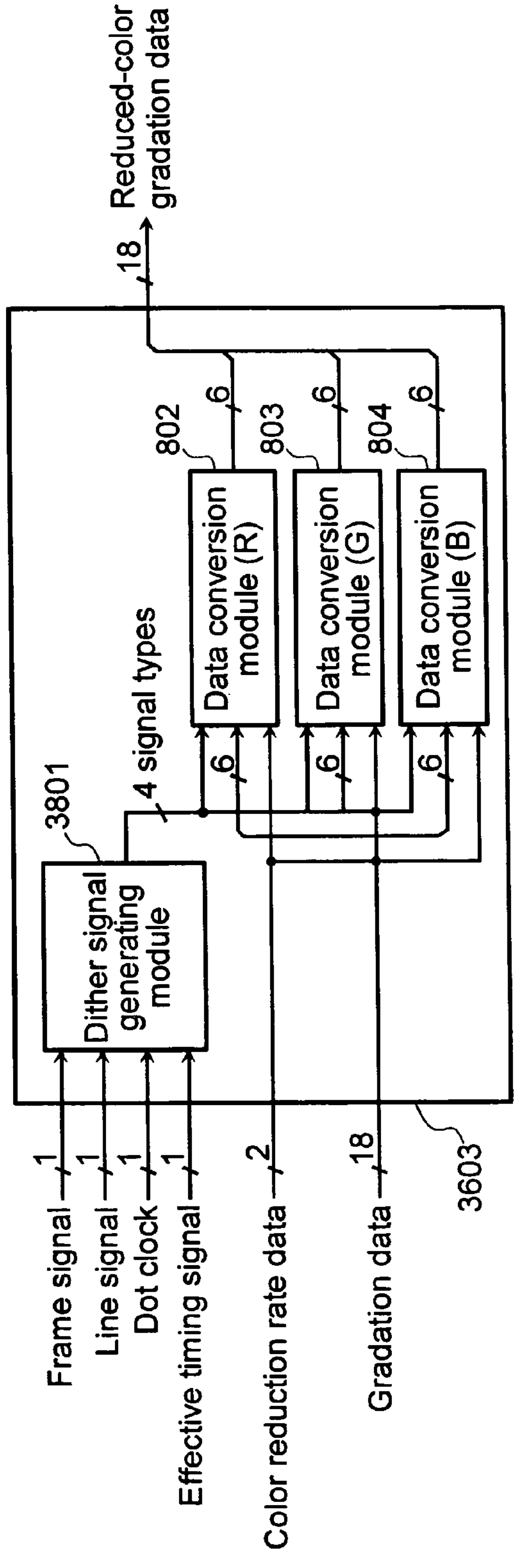
FIG. 38 is a block diagram showing the structure of a dither processing module according to the third embodiment of the present invention.
Figure 39:
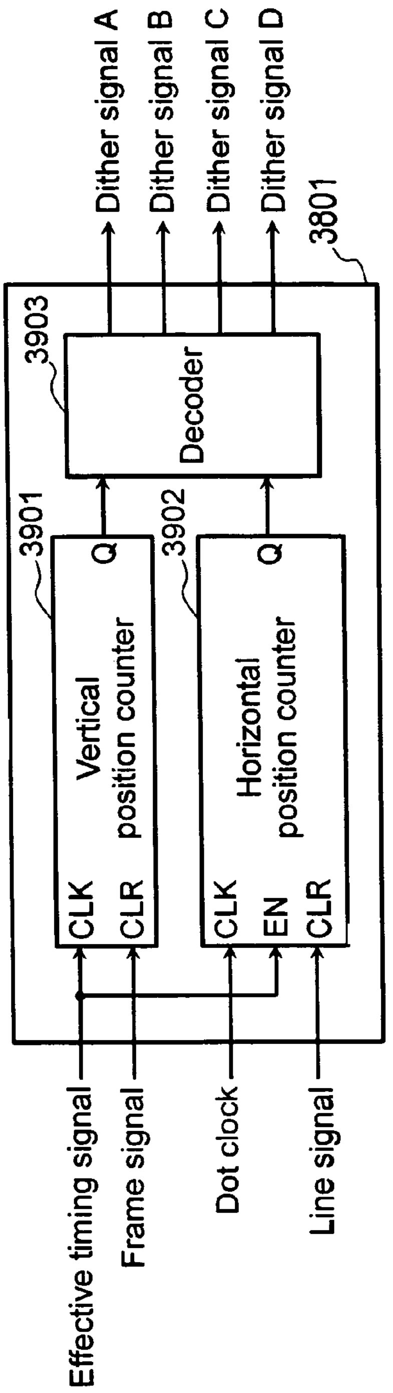
FIG. 39 is a block diagram showing the structure of a dither signal generating module according to the third embodiment of the present invention.

FIG. 38 is a block diagram showing the structure of a dither processing module according to the third embodiment of the present invention. FIG. 39 is a block diagram showing the structure of a dither signal generating module according to the third embodiment of the present invention. FIG. 38 shows a dither signal generating module 3801. Data conversion modules 802–804 are identical to those from the first embodiment of the present invention. As shown in FIG. 39, the dither signal generating module 3801 includes a vertical position counter 3901, a horizontal position counter 3902, and a decoder 3903. The vertical position counter 3901 is cleared during the “high” interval of the frame signal and counts up in sync with the leading edges of the effective interval signals. The horizontal position counter 3902 is cleared during the “high” interval of the line signal and counts up in sync with the leading edges of the dot clock when the effective interval signal is “high”.

As a result, the outputs from these counters are equivalent to the vertical address and the horizontal address shown in FIG. 9. Furthermore, the decoder 3903 at the next state generates the four types of dither signals shown in FIG. 9 based on the received counter values. Furthermore, since the data conversion module is identical to the one from the first embodiment of the present invention, reduced-color gradation data identical to that of the first embodiment is output from the dither processing module 3603. The gradation voltage generating module 107 has the same structure and performs the same operations as that of the first embodiment of the present invention, and so its description, will be omitted here.

Figure 40:
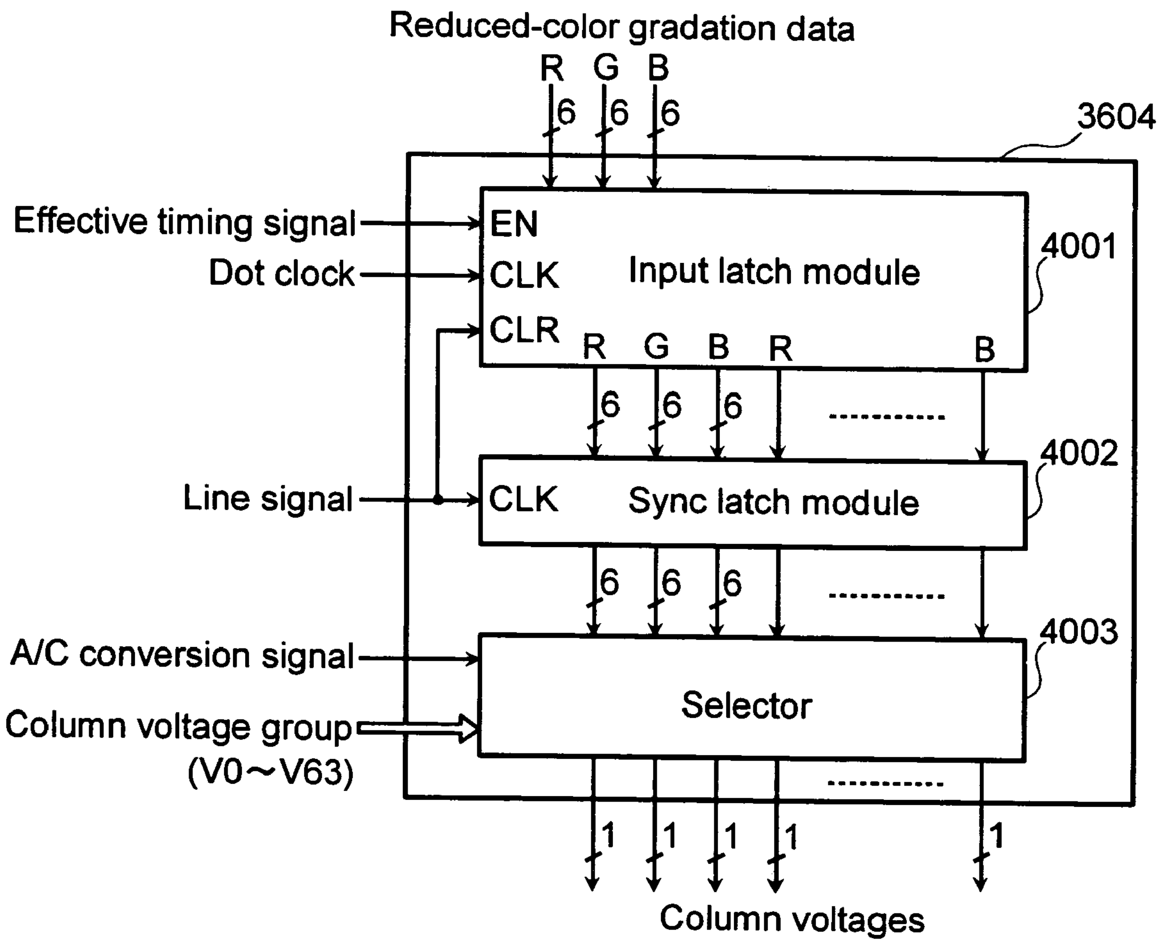
FIG. 40 is a block diagram showing the structure of a gradation voltage selector according to the third embodiment of the present invention.
Figure 41:
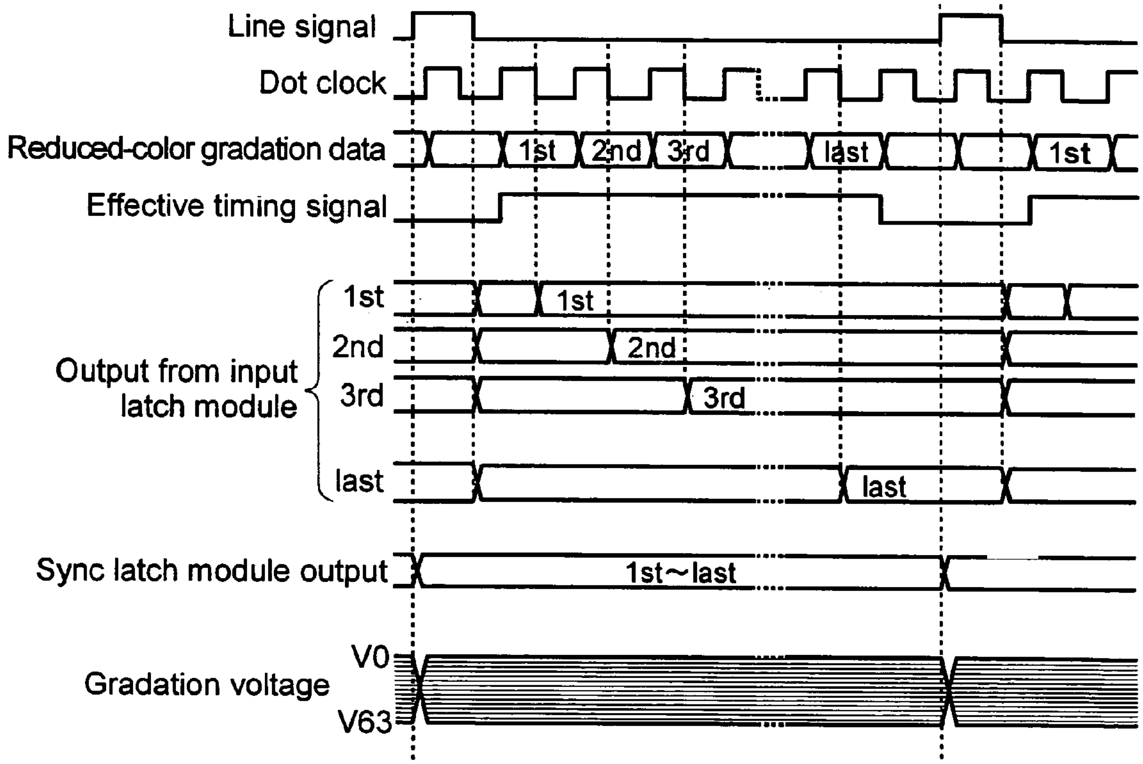
FIG. 41 is a timing chart illustrating the operations performed by the gradation voltage selector of the third embodiment of the present invention.

FIG. 40 is a block diagram showing the structure of a gradation voltage selector according to the third embodiment of the present invention. FIG. 41 is a timing chart illustrating the operations performed by the gradation voltage selector of the third embodiment of the present invention, In FIG. 40, the gradation voltage selector 3604 is a circuit block that captures and synchronizes reduced-color gradation data transferred for each RGB pixel, selects a gradation voltage level from multiple gradation voltages based on the gradation level, and outputs the result. As shown in FIG. 40, it includes a capture latch module 4001, a sync latch module 4002, and a selector 4003.

When the trailing edge of the line signal is cleared and the effective interval signal is "high", the capture latch module 4001 captures one row of reduced-color gradation data at a time in sync with the leading edge of the dot clock. The sync latch module 4002 captures the reduced-color gradation data output from the capture latch module 4001 in sync with the leading edge of the line signal and outputs the result to the selector 4003. The selector 4003 selects one out of multiple gradation voltage levels based on the reduced-color gradation data and the AC conversion signal. The operations performed by the selector 4003 are identical to those of the selector 1902 from the first embodiment of the present invention. FIG. 41 shows the operation timing of the gradation voltage selector 3604.

As in the first embodiment of the present invention, the third embodiment of the present invention described above switches the number of colors to be displayed based on color reduction rate data and stops the operation of driver circuits that are not needed for the displayed color count. As a result, the display device can consume less power. Also, the display can be made easier to use by providing a high-quality mode with little color reduction and a low-power mode with more color reduction. Furthermore, the display device can be connected to a graphic controller, and a raster scan signal can be sent to the display device. Also, dithering was used in—the third embodiment, but it goes without saying that FRC processing can be performed as well.

Figure 42:
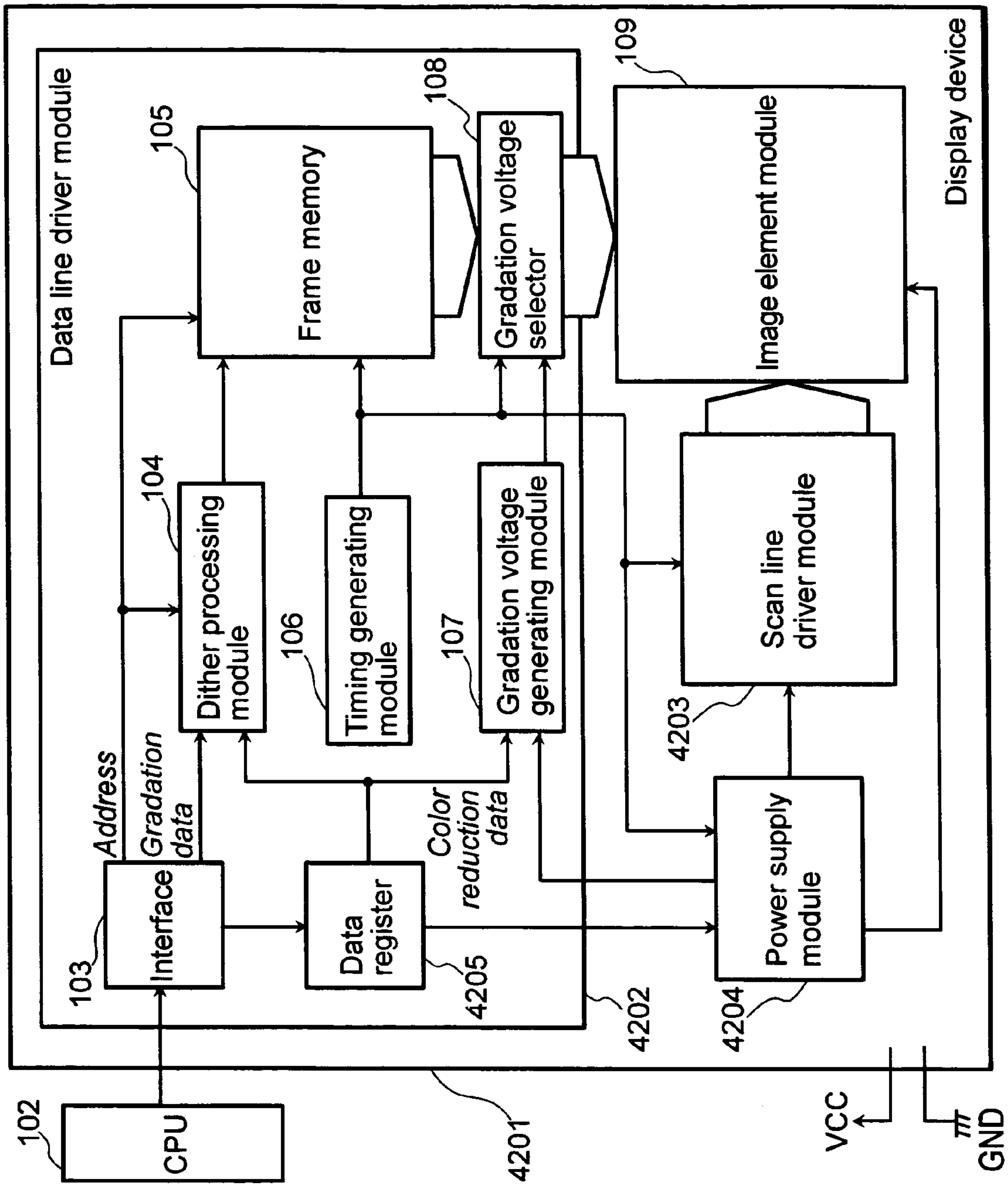
FIG. 42 is a block diagram showing the structure of a display device according to the fourth embodiment of the present invention.
Figure 43:
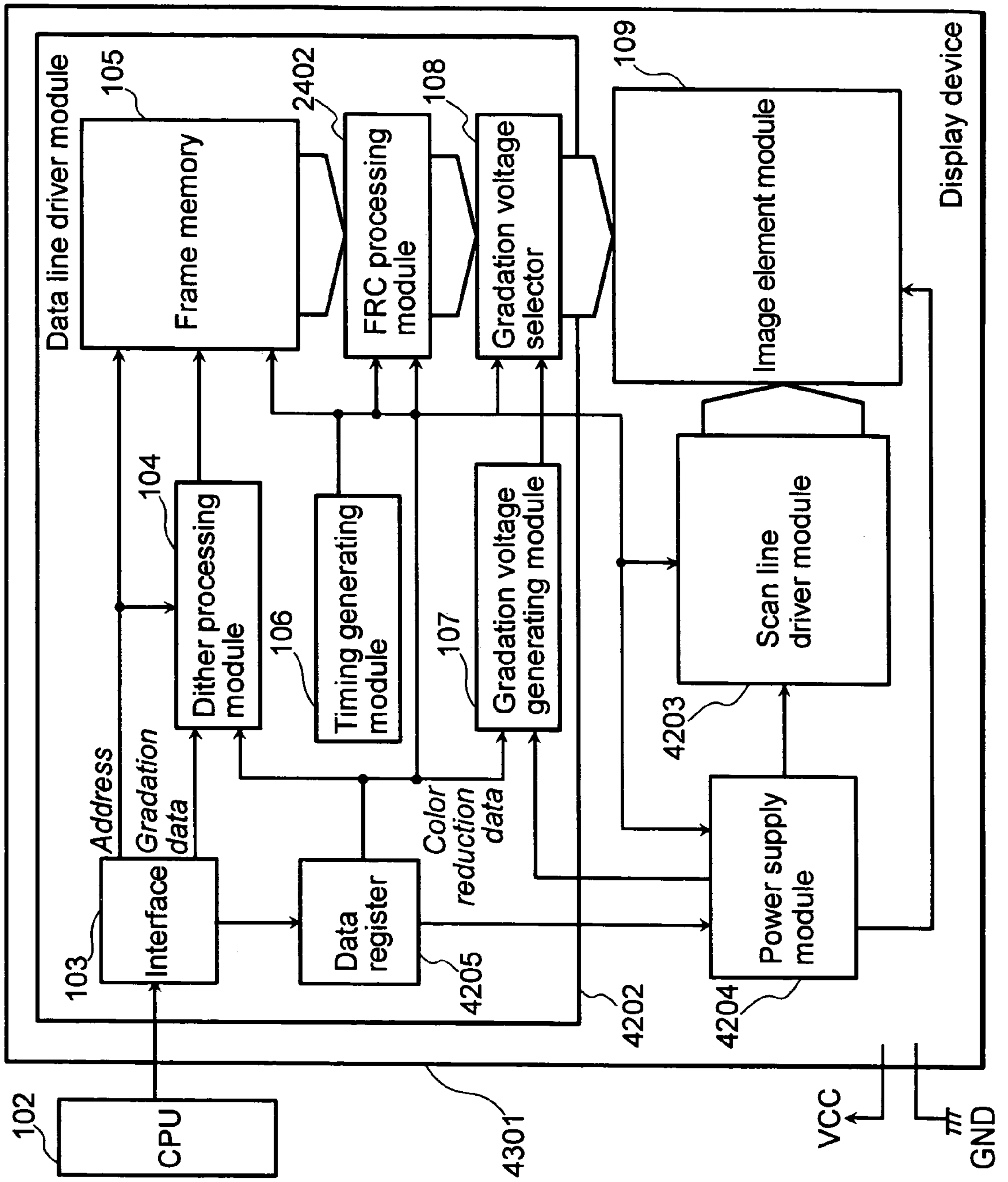
FIG. 43 is a block diagram showing the structure of a display device according to the fourth embodiment of the present invention.
Figure 44:
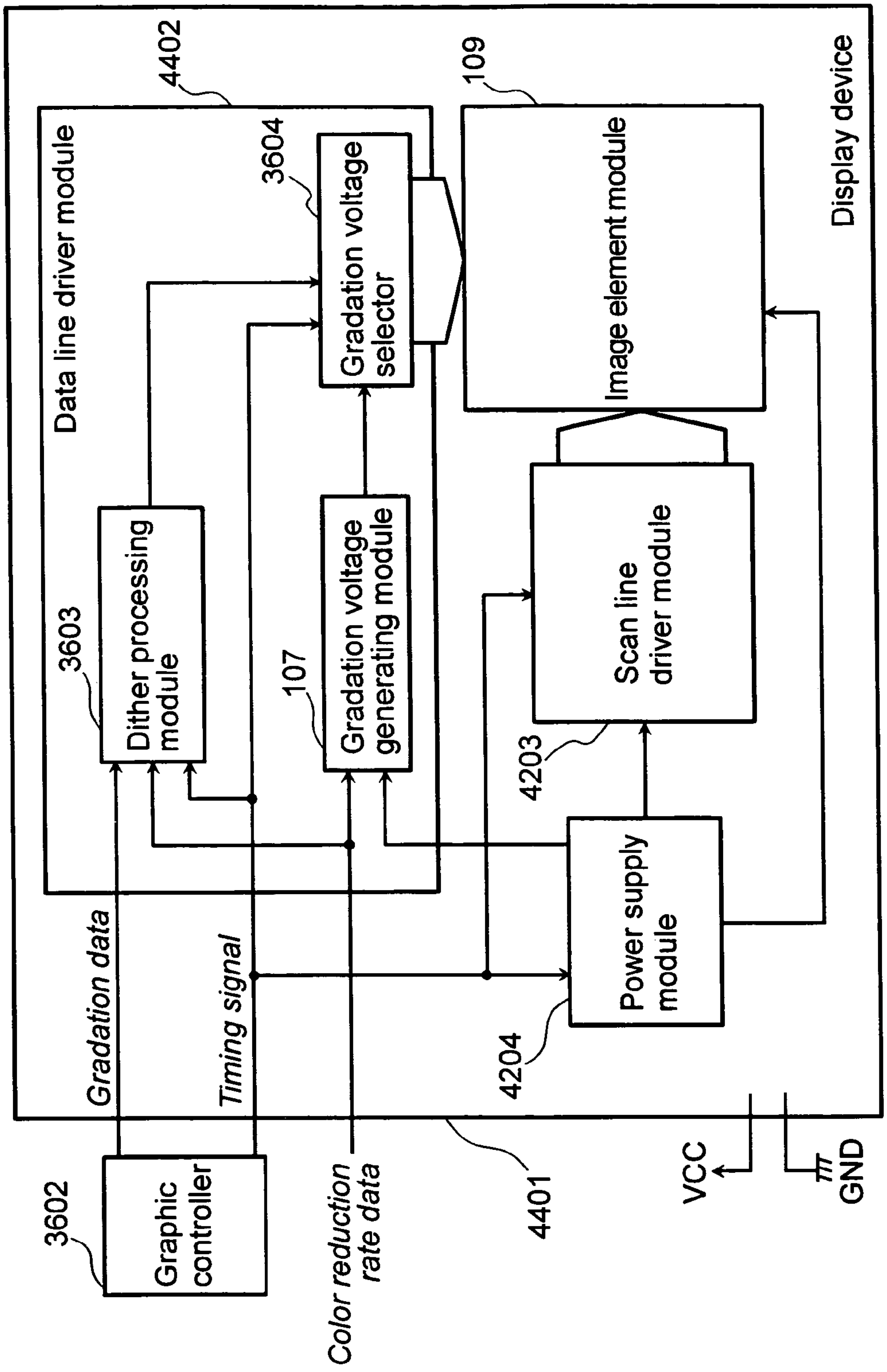
FIG. 44 is a block diagram showing the structure of a display device according to the fourth embodiment of the present invention.

Next, a fourth embodiment of the present invention will be described with reference to FIG. 42 through FIG. 44. In the fourth embodiment of the present invention, the display device driver circuit from the first through the third embodiments of the present invention are implemented in a display device. FIG. 42 and FIG. 43 show structures where a display device driver circuit is equipped with its own frame memory. FIG. 44 shows a structure where the display device driver circuit is not equipped with a frame memory.

FIG. 42 is a block diagram showing the structure of a display device according to the fourth embodiment of the present invention. FIG. 43 is a block diagram showing the structure of a display device according to the fourth embodiment of the present invention. FIG. 44 is a block diagram showing the structure of a display device according to the fourth embodiment of the present invention.

FIG. 42 shows a display device 4201, which broadly includes a data line driver module 4202, a scan line driver module 4203, a power supply 4204, and an pixel module 109. The data line driver module 4202 is similar to the data line driver' module 101 as used in the first embodiment of the present invention, but differs in that it is equipped with a data register 4205. The data register 4205 is an element that stores various driver parameters transferred from the CPU. These parameters are transferred to the different circuit blocks.

Examples of these parameters include the drive line count, the frame frequency, and the like. The color reduction rate data, which is characteristic of the present invention, is also included in these parameters. An example of a method for transferring parameters from the CPU is to have the transfer method that is illustrated in FIG. 3 shared between the frame memory and the data register. In this case, an unused bit (e.g., D17) in the addressing cycle shown in FIG. 4 can be used as a frame memory/data register identification bit.

The scan line driver module 4203 is a circuit block that drives the scan line for the pixel module 109. The output signal waveform is the same as that of the scan voltage shown in FIG. 23. The power supply 4204 outputs the common voltage shown in FIG. 23 and also generates the power-supply voltage needed by the display device of the present invention and sends the output to the different circuit blocks. This operation can be achieved using means for stepping up a system power supply provided from the outside and means for adjusting the stepped-up voltage. The control information for voltage adjustment and the like are transferred from the data register 4205. The pixel module 109 has the same structure and operates in the same manner as that of the first embodiment of the present invention, and so its description will be omitted here.

As described above, FIG. 43 shows an FRC processing module added to the data line driver circuit in the display device, and FIG. 44 shows a data line driver circuit without a frame memory. The corresponding operations consist of the addition of the scan line driver circuit and the power supply to the data line driver circuits shown in FIG. 42 and FIG. 36, and so their detailed descriptions will be omitted here.

As in the first through the third embodiments of the present invention, the fourth embodiment of the present invention, as described above, switches the number of colors to be displayed based on color reduction rate data and stops the operation of driver circuits that are not needed for the displayed color count. As a result, the display device can consume less power. Also, the display can be made easier to use by providing a high-quality mode with little color reduction and a low-power mode with more color reduction.

The present invention is not restricted to the structure specifically described in the claims and to the embodiments described above. Various modifications may be effected without departing from the spirit of the invention.

What is claimed:

1. A display driver for outputting gradation voltages corresponding to gradation data from an external device to pixels, said display driver comprising:

a processing module for converting first gradation data from said external device into second gradation data by frame rate control processing;

a generator for generating a plurality of gradation voltages having a plurality of levels based on a reference voltage; and a selector for selecting at least one gradation voltage corresponding to said second gradation data from said plurality of gradation voltages generated by said voltage generator;

wherein said first gradation data includes multi-bits for each color of red, green and blue;

wherein said voltage generator controls a number of output of said gradation voltages;

wherein an interval of said gradation levels is uneven; and wherein said voltage generator outputs said plurality of gradation voltages includes a maximum gradation voltage and a minimum gradation voltage when no color of said gradation data is reduces, and always outputs at least the maximum gradation voltage and the minimum gradation voltage and stops outputting at least one of said gradation voltages that is unnecessary for displaying as a result of color reduction, when said color of said gradation data is reduced.

2. A display driver as described in claim 1, wherein said voltage generator comprises a resistor for dividing said reference voltage so as to provide divided voltages and amplifiers for buffering said divided voltages, and stops supplying power to said amplifiers to stop outputting said at least one said gradation voltages that is unnecessary for displaying as the result of said color reduction.

3. A display driver as described in claim 1, wherein said plurality of gradation voltages include sixty four voltages of V0–V63, said voltage of V63 being said maximum gradation voltage and said voltage of V0 being said minimum gradation voltage.

4. A display driver as described in claim 1, further comprising a register for setting color reduction rate data for said color reduction, a drive line count and a frame frequency from said extemal device.

5. A display driver as described in claim 1, wherein:

said plurality of gradation voltages is divided into a first group of said at least the maximum gradation voltage and the minimum gradation voltage to be outputted when said color is reduced and a second group of gradation voltages to be stopped when said color is reduced;

said voltage generator includes a switch for turning ON/OFF a power supply to said second group of gradation voltages and is in common among said second group of gradation voltages; and said voltage generator controls said switch to stop outputting at least one of said gradation voltages that is unnecessary for displaying as a result of said color reduction when said color is reduced.

6. A display driver for outputting gradation voltages corresponding to gradation data from an external device to pixels, said display driver comprising:

a processing module for converting first gradation data from said external device into second gradation data by frame rate control processing;

a generator for generating said plurality of gradation voltages having a plurality of levels based on a reference voltage; and a selector for selecting at least one gradation voltage corresponding to said second gradation data from said plurality of gradation voltages generated by said voltage generator;

wherein said display driver has a first display mode and a second display mode, a color reduction in said second display mode being greater than a color reduction in said first display mode;

wherein an interval of said gradation levels is uneven;

wherein said first gradation data includes multi-bits for each color of red, green and blue; and wherein said voltage generator comprises a resistor for dividing said reference voltage so as to provide divided voltages and amplifiers for buffering said divided voltages, and outputs said plurality of gradation voltages including a maximum gradation voltage and a minimum gradation voltage in said first display mode, and always outputs at least the maximum gradation voltage and the minimum gradation voltage and stops outputting at least one gradation voltage that is unnecessary for displaying as a result of said color reduction by stopping supplying power to said amplifiers in said second display mode.

7. A display driver for outputting gradation voltages corresponding to gradation data from an external device to pixels, said display driver comprising:

a processing module for converting first gradation data from said external device into second gradation data by frame rate control processing;

a generator for generating sixty four gradation voltages of V0–V63 for each color of red, green and blue based on a reference voltage; and a selector for selecting at least one gradation voltage corresponding to said second gradation data from said sixty four gradation voltages generated by said voltage generator;

wherein said display driver has a first display mode and a second display mode, a color reduction in said second display mode being greater than a color reduction in said first display mode;

wherein said gradation data includes six bits for each color of red, green and blue;

wherein an interval of levels of said gradation voltages is uneven;

wherein said voltage generator controls a number of output of said gradation voltages; and wherein said voltage generator outputs said plurality of gradation voltages including a maximum gradation voltage and a minimum gradation in said first display mode, and always outputs at least gradation voltages of V0 and V63 and stops outputting gradation voltages other than said gradation voltages of V0 and V63 in said second display mode.

8. A display driver as described in claim 7, wherein said processing module converts said first gradation data into said second gradation data by frame rate control processing.

9. A display driver for outputting gradation voltages corresponding to gradation data from an external device to pixels, said display driver comprising:

a interface for inputting first gradation data from said external device;

a memory for storing said first gradation data;

a processing module for converting said first gradation data into second gradation data by frame rate control processing;

a timing generator for generating a synchronizing signal based on control data from said external device;

a voltage generator for generating a plurality of gradation voltages having a plurality of levels based on a reference voltage; and a selector for selecting at least one gradation voltage corresponding to said second gradation data from said memory from said plurality of gradation voltages generated by said voltage generator;

wherein said first gradation data includes multi-bits for each color of red, green and blue;

wherein said voltage generator controls a number of output of said gradation voltages;

wherein an interval of said gradation levels is uneven; and wherein said voltage generator outputs said plurality of gradation voltages including a maximum gradation voltage and a minimum gradation voltage when no color of said gradation data is reduced, and always outputs at least the maximum gradation voltage and the minimum gradation voltage and stops outputting at least one said gradation voltages that is unnecessary for displaying as a result of color reduction when said color of said gradation data is reduced.

10. A display driver for outputting gradation voltages corresponding to gradation data from an external device to pixels, said display driver comprising:

a processing module for converting first gradation data from said external device into second gradation data by frame rate control processing;

a generator for generating a plurality of gradation voltages having a plurality of levels based on a reference voltage; and a selector for selecting at least one gradation voltage corresponding to said second gradation data from said plurality of gradation voltages generated by said voltage generator;

wherein said display driver has a first display mode and a second display mode, a consumption of power in said second display mode being lower than a consumption of power in said first display mode;

wherein said first gradation data includes multi-bits for each color of red, green and blue;

wherein an interval of levels of said gradation voltages is uneven;

wherein said voltage generator controls a number of output of said gradation voltages according to said display modes; and wherein said voltage generator outputs sixty four gradation voltages of V0-V63 in said first display mode, and always outputs at least a maximum gradation voltage and a minimum gradation voltage and stops outputting at least one said gradation voltages that is unnecessary for display in said second display mode.

11. A display driver as described in claim 10, wherein said voltage generator comprises a resistor for dividing said reference voltage so as to provide divided voltages and amplifiers for buffering said divided voltages, and stops supplying power to said amplifiers to stop outputting said at least one said gradation voltages that is unnecessary for displaying.

12. A display driver as described in claim 11, wherein said plurality of gradation voltages include sixty four voltages of V0–V63, said voltage of V63 being said maximum gradation voltage and said voltage of V0 being said minimum gradation voltage.

13. A display driver as described in claim 10, wherein said processing module converts said first gradation data into said second gradation data by frame rate control processing according to said display modes.

14. A display driver as described in claim 13, wherein said color reduction is carried out in a stand-by mode of a cellular phone that includes said display driver.

15. A display driver for outputting gradation voltages corresponding to gradation data from an external device to pixels, said display driver comprising:

an interface for inputting first gradation data from said external device;

a memory for storing said first gradation data;

a processing module for converting said first gradation data into second gradation data by frame rate control processing;

a timing generator for generating a synchronizing signal based on control data from said external device;

a voltage generator for generating a plurality of gradation voltages having a plurality of levels based on a reference voltage; and a selector for selecting at least one gradation voltage corresponding to said second gradation data from said memory from said plurality of gradation voltages generated by said voltage generator;

wherein said display driver has a first display mode and a second display mode, a consumption of power in said second display mode being lower than a consumption of power in said first display mode;

wherein said first gradation data includes multi-bits for each color of red, green and blue;

wherein said voltage generator controls a number of output of said gradation voltages according to said display modes;

wherein an interval of said gradation levels is uneven; and wherein said voltage generator outputs said plurality of graduation voltages including a maximum gradation voltage a minimum gradation voltage in said first display mode, and always outputs at least the maximum gradation voltage and the minimum gradation voltage and stops outputting at least one said gradation voltages that is unnecessary for displaying in said second display mode.

16. A display driver as described in claim 15, further comprising a register for setting color reduction rate data for said color reduction, a drive line count and a frame frequency from said external device.

17. A display driver as described in claim 15, wherein:

said plurality of gradation voltages is divided into a first group of said at least the maximum gradation voltage and the minimum gradation voltage to be outputted when said color is reduced and a second group of gradation voltages to be stopped when said color is reduced;

said voltage generator includes a switch for turning ON/OFF a power supply to said second group of gradation voltages and is in common among said second group of gradation voltages; and said voltage generator controls said switch to stop outputting at least one of said gradation voltages that is unnecessary for displaying as a result of said color reduction when said color is reduced.

18. A display driver for outputting gradation voltages corresponding to gradation data from an external device to pixels, said display driver comprising:

a processing module for converting first gradation data from said external device into second gradation data by frame rate control processing;

a generator for generating said plurality of gradation voltages having a plurality of levels based on a reference voltage; and a selector for selecting at least one gradation voltage corresponding to said second gradation data from said plurality of gradation voltages generated by said voltage generator;

wherein said display driver has a first display mode and a second display mode, a consumption of power in said second display mode being lower than a consumption of power in said first display mode;

wherein an interval of said gradation levels is uneven;

wherein said first gradation data includes multi-bits for each color of red, green and blue; and wherein said voltage generator comprises a resistor for dividing said reference voltage so as to provide divided voltages and amplifiers for buffering said divided voltages, and outputs said plurality of gradation voltages including a maximum gradation voltage and a minimum gradation voltage in said first display mode, and always outputs at least the maximum gradation voltage and the minimum gradation voltage and stops outputting at least one gradation voltage that is unnecessary for displaying by stopping supplying power to said amplifiers in said second display mode.

19. A display driver for outputting gradation voltages corresponding to gradation data from an external device to pixels, said display driver comprising:

a processing module for converting first gradation data from said external device into second gradation data by frame rate control processing;

a generator for generating sixty four gradation voltages of V0–V63 for each color of red, green and blue based on a reference voltage; and a selector for selecting at least one gradation voltage corresponding to said second gradation data from said sixty four gradation voltages generated by said voltage generator;

wherein said display driver has a first display mode and a second display mode, a consumption of power in said second display mode being lower than a consumption of power in said first display mode;

wherein said first gradation data includes six bits for each color of red, green and blue;

wherein an interval of levels of said gradation voltages is uneven;

wherein said voltage generator outputs or stops outputting each gradation voltage according to said display modes; and wherein said voltage generator outputs said sixty four gradation voltages of V0-V63 in said first display mode, and always outputs at least gradation voltages of V0 and V63 and stops outputting other gradation voltages other than said gradation voltages of V0 and V63 in said second display mode.

* * * * *